US009303443B2

(12) United States Patent
Lucas

(10) Patent No.: US 9,303,443 B2
(45) Date of Patent: Apr. 5, 2016

(54) FOLDING FACADE OR FOLDING AWNING ARRANGEMENT AND ACTUATING DEVICE FOR THE SAME

(71) Applicant: BELU AG, Lingen/Ems (DE)

(72) Inventor: Bernhard Lucas, Lingen/Ems (DE)

(73) Assignee: BELU AG, Lingen/Ems (DE)

( * ) Notice: Subject to any disclaimer, the term of this patent is extended or adjusted under 35 U.S.C. 154(b) by 0 days.

(21) Appl. No.: 14/289,292

(22) Filed: May 28, 2014

(65) Prior Publication Data

US 2014/0326417 A1    Nov. 6, 2014

Related U.S. Application Data

(63) Continuation of application No. 13/666,647, filed on Nov. 1, 2012, now abandoned, which is a continuation of application No. 12/596,335, filed as application No. PCT/EP2008/003029 on Apr. 16, 2008, now abandoned.

(30) Foreign Application Priority Data

Apr. 16, 2007    (DE) ............... 20 2007 005 558 U
Oct. 4, 2007    (DE) ............... 10 2007 047 626

(51) Int. Cl.
*E06B 3/48*    (2006.01)
*E04F 10/10*    (2006.01)
(Continued)

(52) U.S. Cl.
CPC ............... *E06B 3/481* (2013.01); *E04F 10/10* (2013.01); *E05B 65/0021* (2013.01);
(Continued)

(58) Field of Classification Search
CPC .... E06B 3/481; E05B 65/0021; E05D 15/264

USPC ............................................. 160/209
See application file for complete search history.

(56) References Cited

U.S. PATENT DOCUMENTS 1,348,125 A    7/1920    Rush
1,412,871 A *  4/1922    Johnson ................... 160/189
(Continued)

FOREIGN PATENT DOCUMENTS

DE    2001349 A1    7/1971
DE    19905904 A1    8/2000

OTHER PUBLICATIONS

Tanzler, Ansgar; International Search Report; Date of mailing Apr. 9, 2008; Date of Completion Jun. 8, 2008; 4 pages (English translation and foreign version); European Patent Office, P.B. 5818 Patentlaan 2 NL-2280 HV Rijswijk.

*Primary Examiner* — Katherine Mitchell
*Assistant Examiner* — Marcus Menezes
(74) *Attorney, Agent, or Firm* — Rankin, Hill & Clark LLP

(57) ABSTRACT

A folding façade or folding awning arrangement includes at least two façade or awning elements, wherein a first façade or awning element is fixed on a building so that it can pivot about an axis, and wherein a second façade or awning element is pivotally held about a second displaceable axis and can be displaced along guides by way of a drive member, and wherein further a first collapsing edge of the first façade or awning element is pivotally connected to a second collapsing edge of the second façade and awning element to form a collapsing joint and can be moved in a manner released from the guides, collapsing transversely to the façade. The arrangement further includes at least one collapsible/fold-out and/or locking arrangement. Safe operation is achieved in that at least one pivoting actuating element is provided in the form of a collapsing/fold-out, pulling/drawing, and/or locking arrangement.

20 Claims, 12 Drawing Sheets

(51) Int. Cl.
  *E05B 65/00* (2006.01)
  *E05D 15/26* (2006.01)
  *E04F 13/08* (2006.01)
  *E05D 13/00* (2006.01)
  *E06B 9/06* (2006.01)
  *F24J 2/04* (2006.01)

(52) U.S. Cl.
  CPC .............. *E05D 15/262* (2013.01); *E04F 13/08* (2013.01); *E05D 13/12* (2013.01); *E05D 13/14* (2013.01); *E05Y 2900/132* (2013.01); *E06B 9/0669* (2013.01); *F24J 2/0444* (2013.01); *Y02B 10/20* (2013.01)

(56) References Cited

U.S. PATENT DOCUMENTS

| | | | | |
|---|---|---|---|---|
| 1,841,185 A * | 1/1932 | Johnson | | 160/193 |
| 2,155,116 A * | 4/1939 | Cox | | 160/193 |
| 2,408,739 A * | 10/1946 | Dawes | | 160/188 |
| 2,548,042 A | 4/1951 | Mosher | | |
| 2,573,181 A * | 10/1951 | Burr | | 160/191 |
| 2,821,422 A | 1/1958 | Rainman | | |
| 3,022,818 A | 2/1962 | Rolfe | | |
| 3,024,838 A | 3/1962 | Egleston et al. | | |
| 3,138,474 A | 6/1964 | Reiss et al. | | |
| 3,215,191 A | 11/1965 | Richter et al. | | |
| 3,275,064 A * | 9/1966 | Hansen | | 160/206 |
| 3,344,837 A | 10/1967 | Young | | |
| 3,442,318 A | 5/1969 | Smith | | |
| 4,088,172 A | 5/1978 | Pollock | | |
| 4,545,418 A * | 10/1985 | List et al. | | 160/213 |
| 4,637,446 A * | 1/1987 | McQueen et al. | | 160/207 |
| 5,168,914 A * | 12/1992 | Keller | | 160/207 |
| 5,560,658 A * | 10/1996 | Coolman et al. | | 292/28 |
| 5,582,442 A | 12/1996 | Nolte | | |
| 5,601,131 A * | 2/1997 | Morris | | 160/207 |
| 5,732,758 A | 3/1998 | Marko | | |
| 6,300,842 B1 | 10/2001 | Leiter et al. | | |
| 6,547,292 B1 | 4/2003 | Keller | | |
| 7,029,041 B2 | 4/2006 | Keller | | |
| 2008/0224481 A1 | 9/2008 | Geringer et al. | | |

* cited by examiner

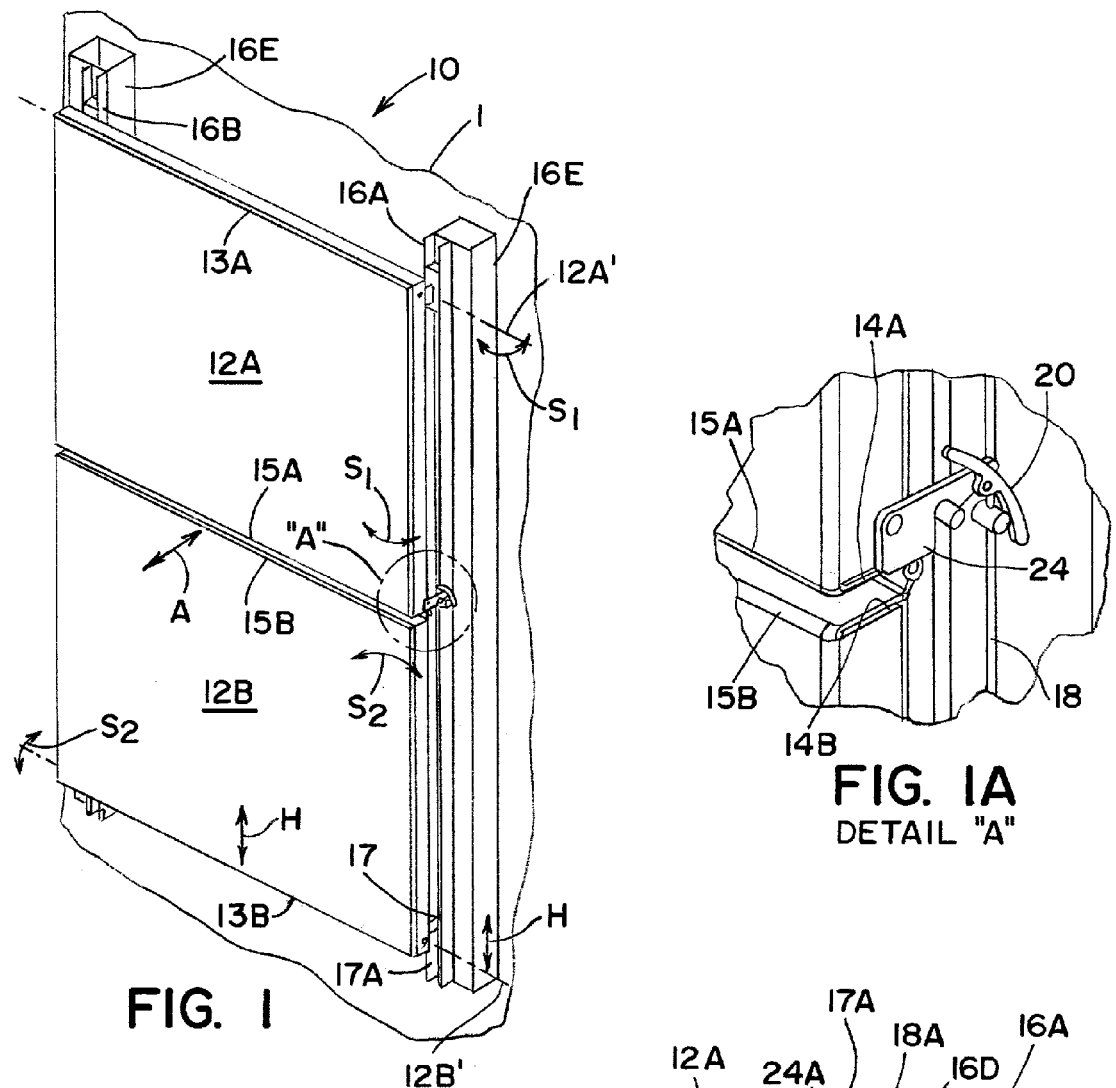
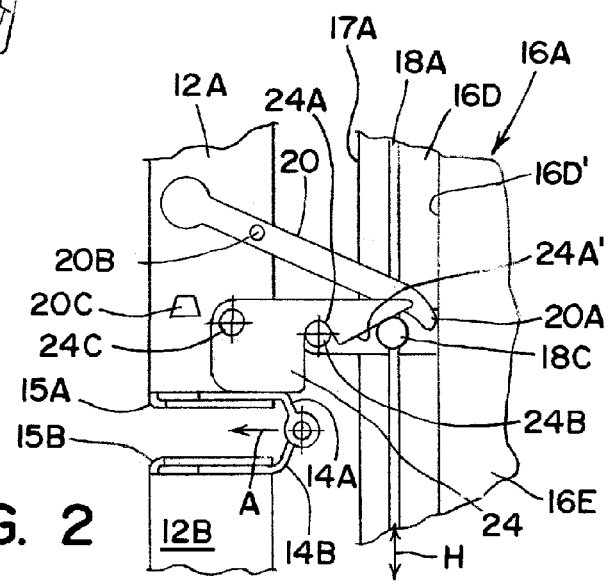
FIG. 1
FIG. 1A
DETAIL "A"
FIG. 2

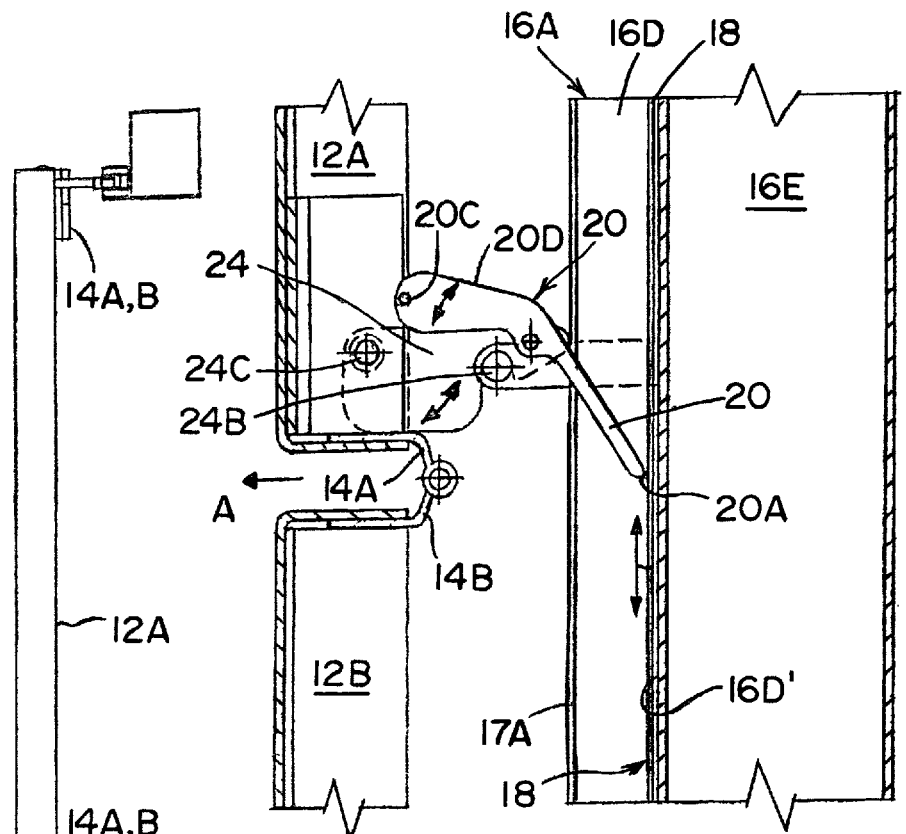
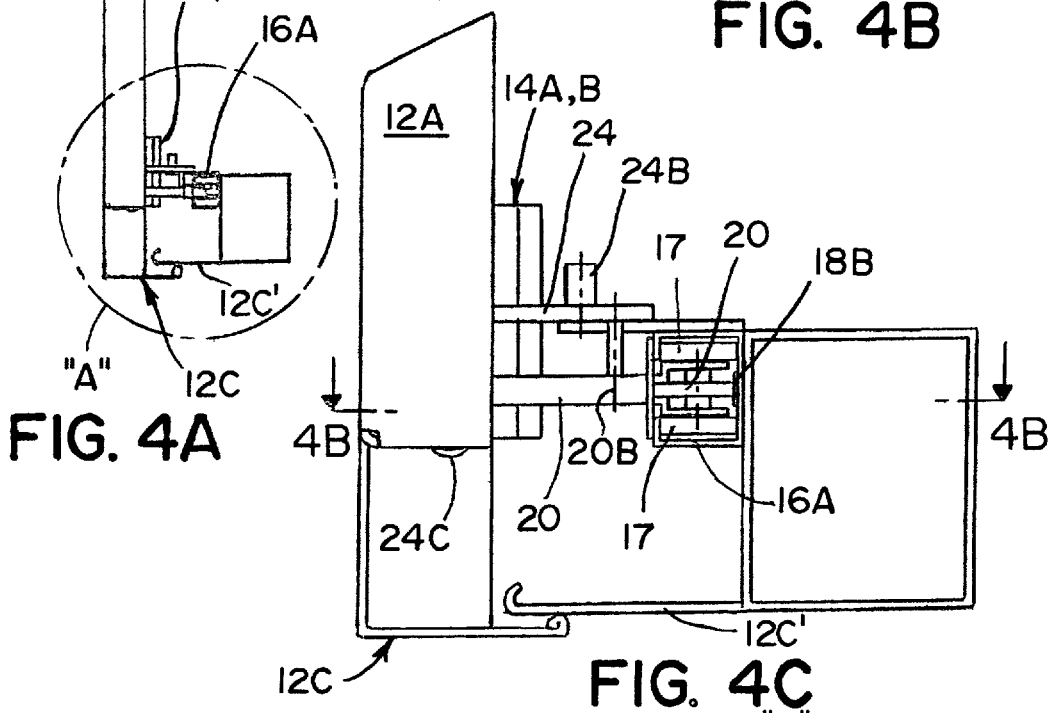
FIG. 4A
FIG. 4B
FIG. 4C
DETAIL "A"

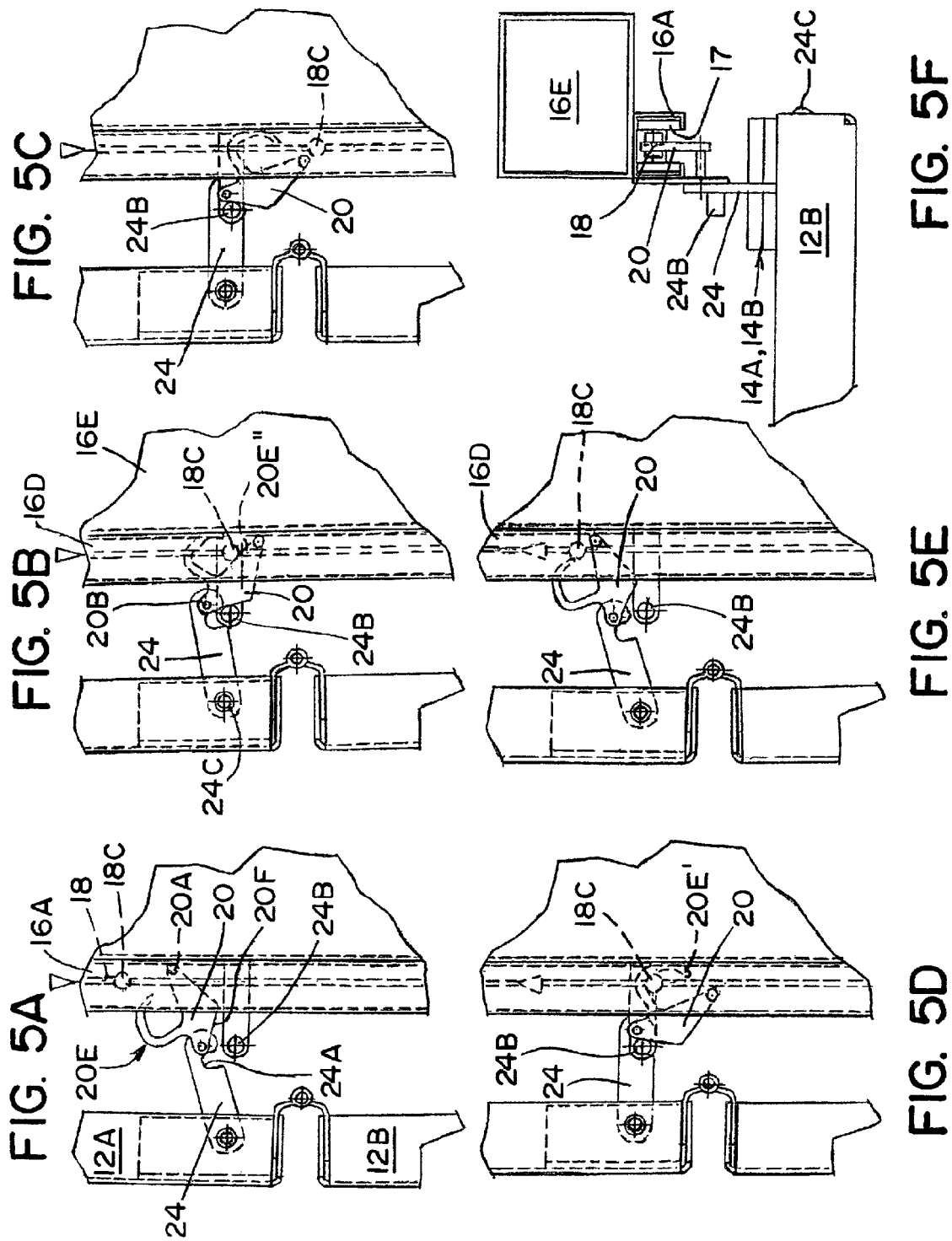

A-A

B-B

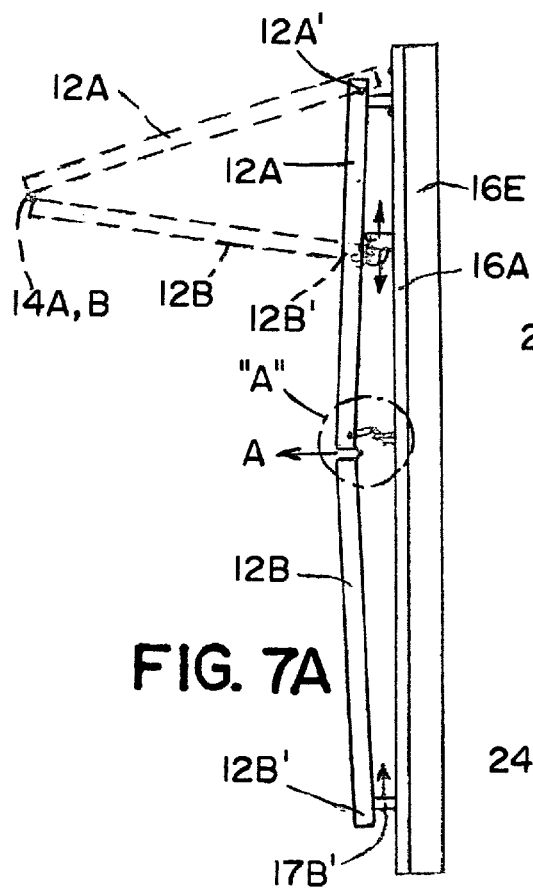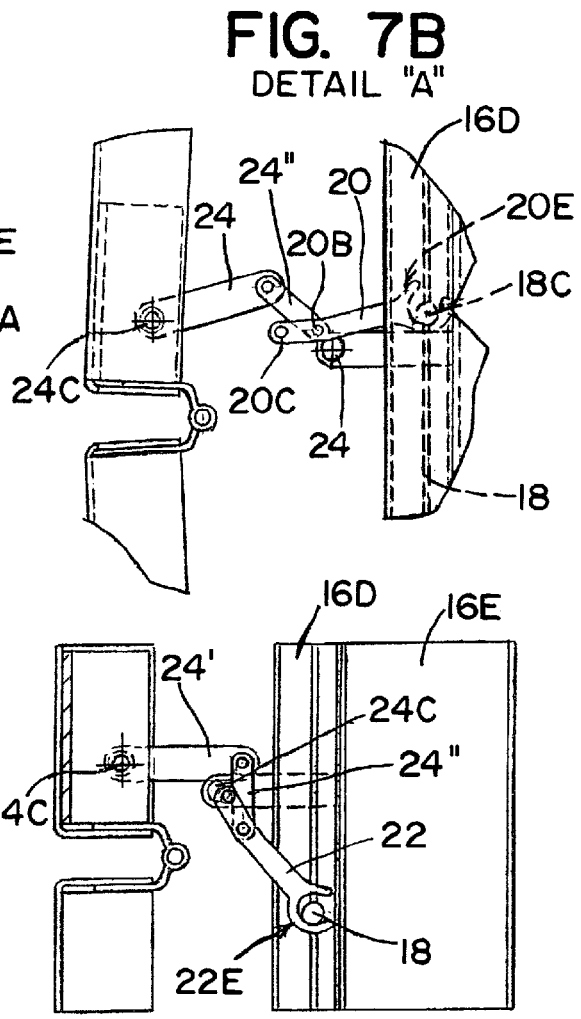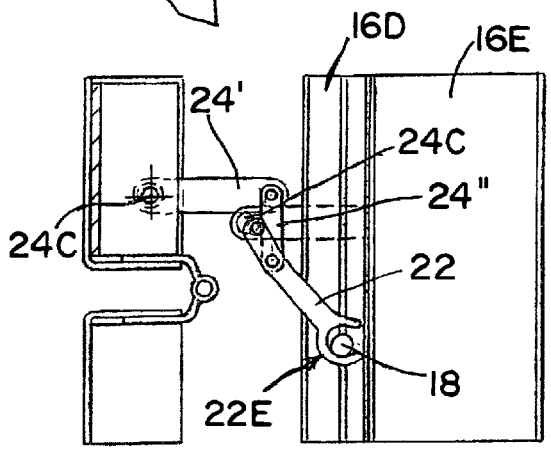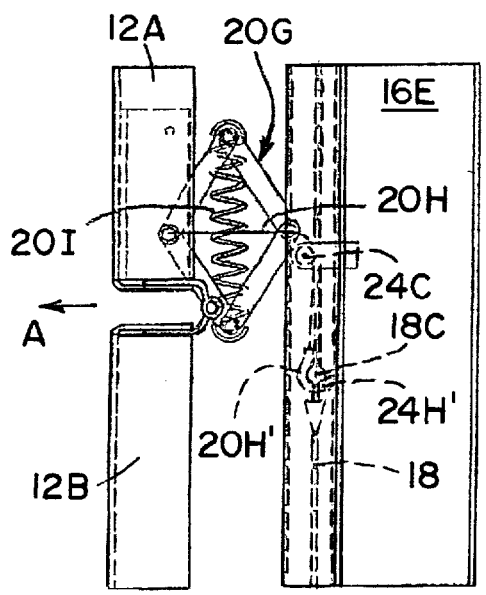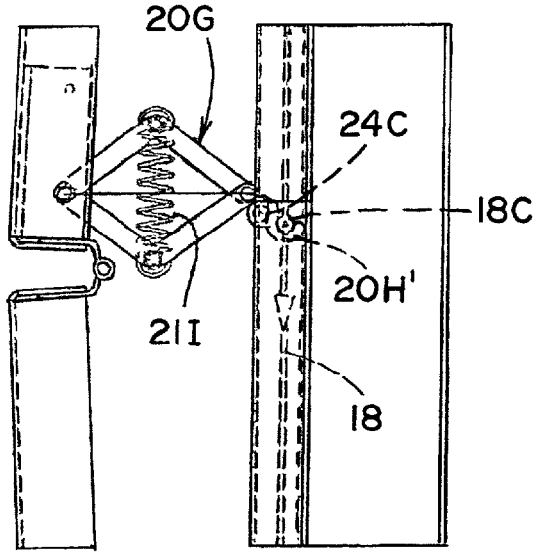

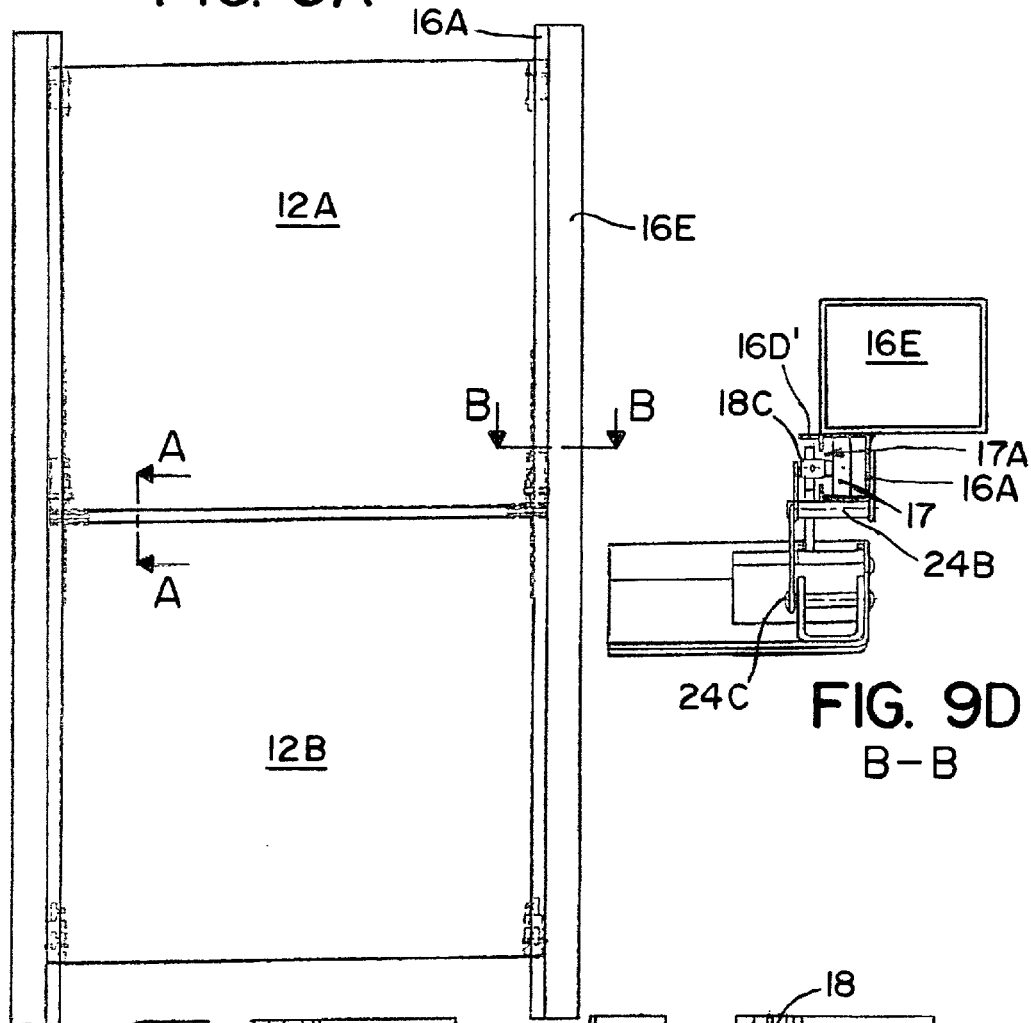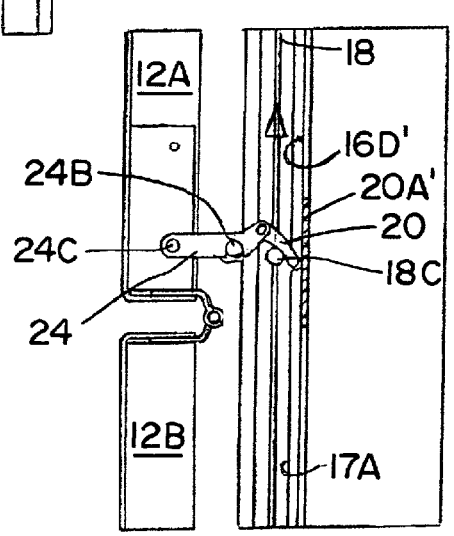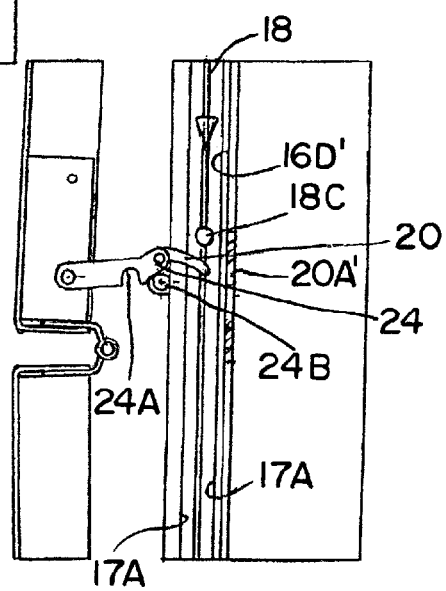

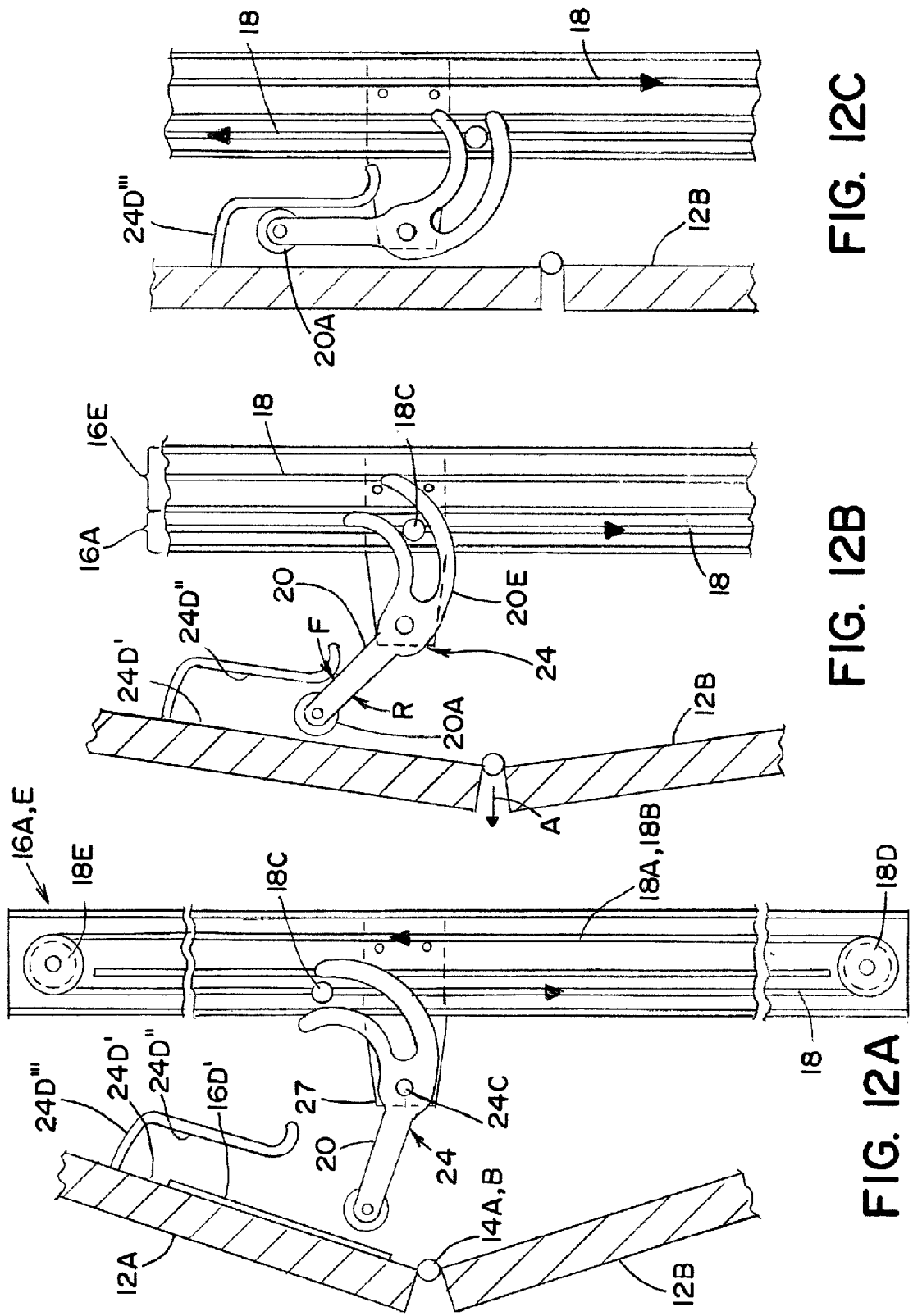

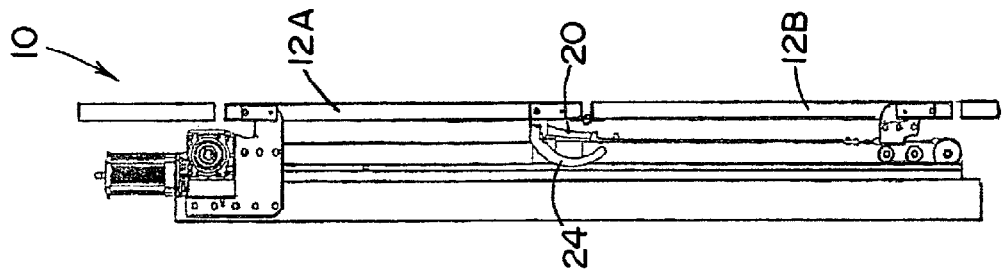
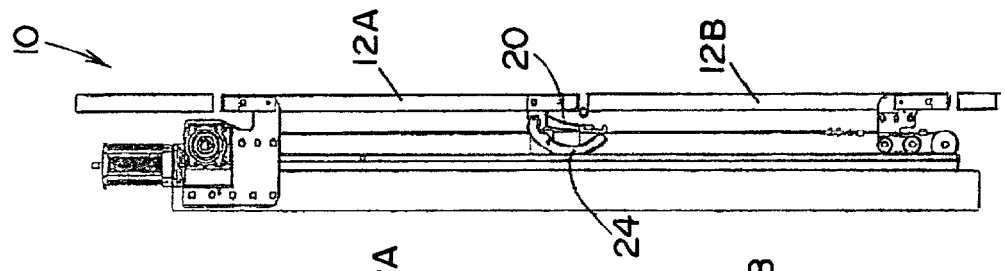
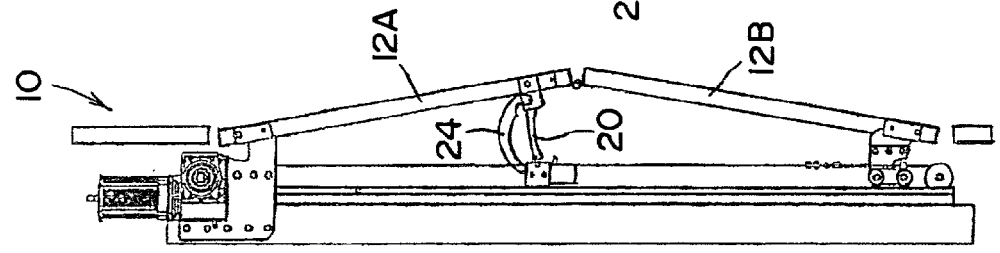
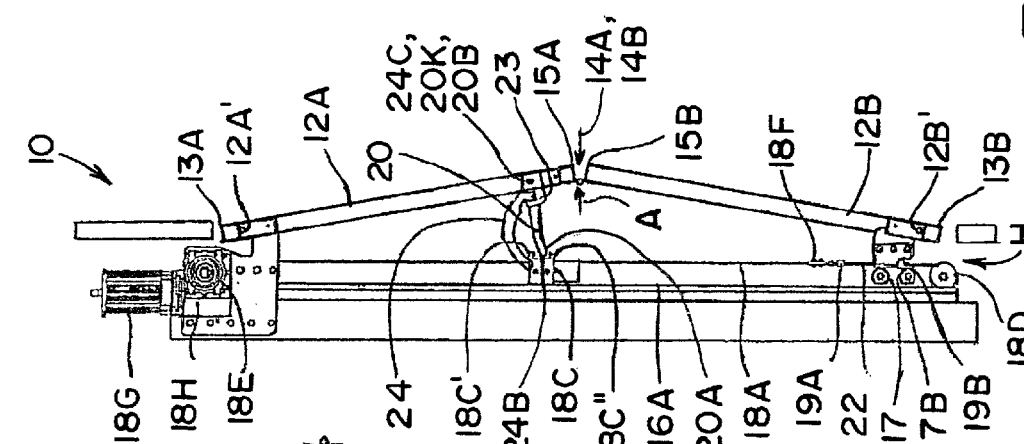
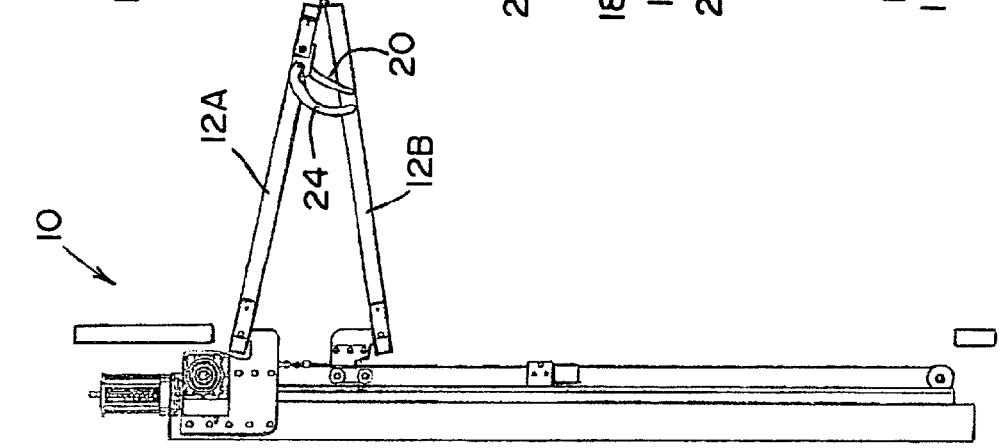

FOLDING FACADE OR FOLDING AWNING ARRANGEMENT AND ACTUATING DEVICE FOR THE SAME

This application is a continuation of U.S. patent application Ser. No. 13/666,647, filed 1 Nov. 2012, which is a continuation of U.S. patent application Ser. No. 12/596,335, filed 16 Oct. 2009, now abandoned, which application claims priority to and the benefit of the filing date of International Application No. PCT/EP2008/003029, filed 16 Apr. 2008, which application claims priority to and the benefit of the filing date of German Application No. 20 2007 005558.7 filed 16 Apr. 2007 and German Application No. 10 2007 047626.6, filed 4 Oct. 2007, all of which are hereby incorporated by reference into the specification of this application.

FIELD OF THE INVENTION

The invention relates to a folding façade or folding awning arrangement, and an operating mechanism for folding façade or folding awning assemblies.

TECHNOLOGICAL BACKGROUND

Folding façade or folding awning arrangements of this type are already known in the form of hangar doors, in the area of store fronts, such as for sidewalk cafes, or as means for protecting against light and/or heat on windows or doors. In most cases they are comprised of only two inherently rigid façade or awning elements, which are arranged in front of an opening of a building, such as a door or doorway, or in front of a window, to allow said opening to be closed up or covered and opened up again. They can be moved horizontally or vertically by folding and unfolding. In the case of vertical movement, the uppermost façade or awning element, which is attached with respect to the building so as to pivot around a horizontal axis near its upper edge, is attached at its lower edge to a façade or awning element located beneath the first, so as to pivot along an axis which is also horizontal, and so as to be capable of folding out transversely to the façade. The lower edge of the lowest façade or awning element is held in vertical guides and is moved upward via tension elements during opening. This causes the attachment joint (folding or fold-out joint) to fold out toward the upper façade or awning element (usually outward), forming an approximately triangular roof together with the lower façade or awning element when fully opened, said roof projecting substantially horizontally and serving as protection against weather or sun. For closing, it is usually necessary only to release the tension element used for opening, and to allow the lowest fastening point to drop downward, thereby lowering the façade or awning elements automatically by virtue of their own weight. With the proper configuration of the hinges or joints and the point of attachment of the tension element on the lower section, and with a proper suspension of the upper section based upon its center of gravity, the folding façade or folding awning arrangement will extend in a straight line when fully lowered. Because there is no direct guidance in the folding area between the façade or awning elements, a locking mechanism for the closed position can be provided for purposes of stabilization, for example against wind pressure, wind suction or vibrations. Currently, such mechanisms are usually provided only for relatively heavy façade elements, for example as manual or electric locking mechanisms.

To allow the folding façade or folding awning arrangement to be reopened, it must be transferred from the extended position of closure into a folding position, before the tension element can effect the continued opening. Folding out of the extended dead-center position between the adjacent elements in the folding area is usually achieved using fold-out rollers arranged in the folding area, which hold the stressed tension element in the closed position in a non-extended, i.e., folded out position. When the tension element is placed under tensile stress under these conditions, it moves back to its extended position, pressing horizontally against the fold-out rollers and causing a first folding out of the extended position of the adjacent façade or awning element in the attachment joint. Alternatively, the folding out process can be effected via a separate, for example electrically actuated, mechanism. Locking mechanisms known in the market, which are integrated into the area of attachment of the tension element at the lower edge of a folding façade arrangement, have proven inadequate in preventing vibrations and noise, and as lacking the power to support pulling in during the closing process or pushing out during the opening process.

DESCRIPTION OF THE INVENTION

One of the aspects of the invention is to configure façade or awning arrangements of this type in such a way as to make them comfortable, especially with respect to opening, closing and keeping them closed, and to make them easy to operate. Other aspects of the invention consist in locking the closed arrangement such that it becomes largely vibration-free or low-vibration, and/or improving its initial outward/inward folding, and/or promoting its inward movement to an extended position.

According to one aspect of the invention a lever-like or length-adjustable actuating element, for example, such as a fold-out, drawing and/or locking means, is placed in contact with an actuated carrier in the fold locking area of the folding arrangement, near the extended position of the folding arrangement, and actuating it.

The actuating element is provided as a pivotable fold-out, drawing and/or locking means, which acts between one of the façade or awning elements and the part of the building which is closed or covered by the façade or awning arrangement, one end of which is fastened with respect to the building or with respect to at least one of the façade or awning elements. At its opposite, unattached end, the actuating element—in the form of a fold-out means—can be displaced along the opposite structural component, in other words a façade or awning element or the opening edge, under direct or indirect contact, pivoting into an active position in which a folding out of the attachment joint is achieved by means of a carrier, actuated by the tension or pressure element. In this, the unattached end of a lever-like fold-out means can be moved over a stationary, inclined surface, and/or the fold-out means undergoes an enlargement of its effective length, or its unattached end area is detachably supported on the actuated carrier. In particular, the unattached end can be raised and/or lowered by the carrier. If the actuating element is or comprises a drawing and/or locking means, this is connected to a locking or drawing stop in or near the extended position of the folding arrangement, and is returned by the actuated carrier to an unlocked position.

With the invention, both vertically and horizontally movable façade or awning elements can be folded out and/or locked, wherein in the closed position, a vertical, inclined, or horizontal plane can be spanned by the folding elements.

A folding façade arrangement within the context of the invention generally refers to a covering or closing arrangement for covering, closing and/or opening up a building surface or opening. The building opening can be the entry and exit area of a parking garage, an opening to a retail shop, a restaurant, a sports arena, etc., wherein the façade elements of the folding façade arrangement assume the job of forming a gate or a door or some other façade front for opening and closing an opening in a building, regardless of whether they fit in visually with the other building façade s in a particular manner, or whether they act as a door, a gate, a window, or the like. Likewise, a folding roof or folding façade arrangement can serve as a roof for a terrace area or similar area in a horizontal or inclined alignment, in order to protect from above against the effects of weather and—when opened—to uncover the area. The uses can also be applied inside a building. For this application, more than two façade elements are more frequently linked with one another so as to be foldable, with two of these folding out in pairs, and guided at the respective other ends. The fold-out points are locked when the arrangement is closed. Multiple carriers can also be moved, spaced from one another, with each of these being assigned to a pair of façade elements, so that a single drive is sufficient for moving a multi-element folding façade or folding awning assembly.

Within the context of the invention, a folding awning arrangement is generally understood as an arrangement in which inherently rigid awning elements cover any area of a building front, in other words even a straight or inclined roof or terrace area, such as a window shutter, a door shutter, a curtain facade, etc., so that the areas of a building section that are opened up when the folding awning arrangement is opened, especially a building front, can be closed again on the building side, and, if necessary, can be specifically opened, such as the opening and non-opening window areas of a glass-front façade, for example.

Within the context of the invention, the façade or awning elements can be closed panels, which serve as light, sound, heat and/or burglary protection, as solar-cell absorption surfaces, and the like, but can also consist of panels with openings, having spaced louvers or holes, for example. So-called accordion shutters, which are known in the market, are considered both folding facades and folding awning assemblies within the context of this invention. The aforementioned protective functions can be further improved if the parallel guiding edges of the façade or awning elements are or will be equipped with edge protecting elements, such as links which project outward, for example, or inward.

In addition, a building or part of a building or area of a building within the context of the invention also refers to any open or closed supporting structure which accommodates or supports a folding façade or folding awning arrangement according to the invention.

Of course, certain deviations in the angle between the guides and the element edges of 90° and/or deviations in the parallel alignment of element edges situated opposite one another has no negative impact on the intended purpose as defined, and is also encompassed by the teaching of the invention.

When the actuating element, especially a tension or pressure element for opening the folding façade or folding awning arrangement, is moved along the guide, the carrier that is attached to it engages in a suitable manner with the fold-out means (hereinafter called the fold-out lever) and pivots it from an initial position in relation to the guide, for example tilted downward (when the facade or awning elements are in the extended position) during the opening movement to a substantially right-angled active position in relation to the guide, resulting in an increased distance between the façade or awning elements and the building, in other words a folding out of the façade or awning elements from their closed extended position. The same effect is achieved when a stationary contact surface for the unattached lever end is tilted in the fold-out direction, i.e., inclined toward the guide for the second element edge. The best power ratios are achieved when the fold-out lever is arranged near the folding area of the folding façade or folding awning arrangement. When the rocker pivot of the fold-out lever is located on one of the moved façade or awning elements, and accordingly, the unattached lever end must be displaced in relation to the building, the displacement zone can be arranged in a particularly functionally secure manner in or on the guide on the building side, which is nevertheless necessary for opening. This supported displacement can be sliding or rolling (FIG. 5), or seated on the carrier (FIG. 13). To enable safe operation (opening and closing), for example even under heavy winds, the fold-out or locking lever can be equipped with a bumper, at least in the area of its unattached end, for its stops on a component fixed to the building: In this context, the bumper, configured as a roller, for example, can also assume a dual function.

In order to first achieve a sufficient horizontal folding out of the folding façade or folding awning arrangement during opening, before significant tensile forces are exerted on the lower façade section, the tension element can be equipped with an extension or free travel zone such that when the tension element is first actuated, although the fold-out lever is already actuated and/or a locking means is released, no or no significant tensile forces are exerted on the end of the lower façade section to be moved. A spring assembly which acts on the tension element can prevent a "slack cable situation" during this fold-out phase in the unstressed or only lightly stressed area of the tension element if gravity in combination with a free travel zone, such as an elongated hole, is not suited to the second element edge in the working area. To transfer pivoting force to the fold-out lever, the tension or pressure element of the actuating element can be equipped with at least one carrier, which acts on the fold-out lever on one side or on both sides.

The actuating element, especially a tension and/or pressure element, can be freely selected, for the most part. It can comprise a hauling cable, but may also comprise a chain or a toothed rod, a toothed belt, a belt with friction lining, a spring assembly, a movable weight, a rotating tension and/or pressure element, or some other elongated drive transfer element. The actuating element can also be guided so as to rotate over upper and lower turning means, and can consist of a combination of a toothed belt on a first partial length and a cable on a second partial length, which has independent inventive significance. It can be equipped with one or more carrier(s), or can enable a carrying function via a single-sided or double-sided positive connection. A carrying function can be implemented via one or more carriers, which are or can be provided on the actuating element, and which fit relatively easily with a turning or winding point due to their size and configuration. In this manner, accordion-like façade or awning elements, i.e., linked with one another, can be folded up and down—while a plurality of separate façade or awning elements can also be opened and closed using a single actuating element. With larger carriers, such as pawl elements for example, or with an articulated assembly that can be actuated as a unit via the actuating element, it can be expedient for the carrier 18C, which is embodied as a sliding element or roller apparatus, for example, to be uncoupled from the drive element 18 when it reaches approximately the area of an upper or lower turning point, a winding of the drive element 18, or the like.

Once the folding façade or folding awning arrangement has been folded out far enough, the fold-out lever is out of engagement with its abutting piece on the building or folding element side. To then transfer the fold-out lever back to its starting position, in which it is again in its functional position for a new opening process, the fold-out lever can be appropriately balanced by a counterweight, or can be returned to a desired functional position, for example under the force of a spring.

In principle, it is possible to assign the fold-out lever a dual function, and to use it simultaneously for locking the folding façade or folding awning arrangement in its extended position—or vice versa. For this purpose, especially a lever arrangement comprised of two pivotable levers, which are non-rotatably connected to one another and have the same pivoting axis, can be provided, one of which is used for folding out and the other for drawing in and/or locking.

In order to ensure particularly strong closing forces, a locking and/or drawing means—hereinafter referred to as the locking and/or drawing lever—is proposed, which cooperates with a locking stop, and which is first pivoted out of its locked position by a carrier when the folding façade or folding awning arrangement is being opened, without this causing any significant horizontal folding out of the folding façade arrangement. With this arrangement it is also possible to arrange the pivoting joint of the locking lever on one of the façade or awning elements, and to arrange the locking stop on the building side. The opposite arrangement is also possible here, however. The mode of operation of the carrier and of the tension or pressure element which drives or moves it with an initial movement, without acting on the moved end of the façade or awning element is the same in principle as with the fold-out lever. Moreover, the locking and/or drawing assembly has independent inventive significance.

To expand the functions of the fold-out lever by the functions of locking—or conversely to expand the locking by the function of the outer lever, a two-component lever assembly can be provided, in which the pivoting joint of the fold-out lever is arranged on an intermediate lever having a locking function, wherein the lever assembly is again actuated via a tension or pressure element. With this arrangement, the tension or pressure element, when first actuated, moves the intermediate lever, which serves as a locking lever, out of its locked position, making it possible for the folding façade or folding awning arrangement to be folded out horizontally. As the action of the tension or pressure element on the fold-out lever continues, the folding out is effected in a single step with the opening movement of the façade or awning elements, wherein any additional actuation for releasing and/or folding out is spared.

If the operating mechanism (locking and/or fold-out apparatus) for the folding façade or folding awning arrangement is located at the edge of the façade or awning elements such that it cooperates with at least one of the lateral guides for the moved façade or awning ends, the visible area of the façade or awning elements on both of their sides (inside and outside) remains free of visually disruptive mechanical components, and a dual purpose of the guides and the tension or pressure elements is achieved. The guides can also be housed in a visually pleasing manner, with a guide slot for the opening function and a recess for engagement and for actuation of the actuating element remaining visible.

In a further improvement of the invention it can be desirable
for the fold-out lever to be located near the assigned fold-out joint;
for the rocker pivot of the fold-out lever to be arranged on one of the façade or awning elements;
for the fold-out lever to have means for drawing and/or for locking the folding façade or folding awning arrangement with the façade or awning elements in an extended position;
for a dual-component, linked lever assembly, comprised of the fold-out lever and an intermediate or coupling lever, to be provided;
for the intermediate or coupling lever to be a locking lever comprising a locking means;
for the tension or pressure element to act on the two-part lever assembly, especially on the fold-out means, such that first, when the façade or awning elements are released, the drawing and/or locking means are displaced out of the working position in which folding out is prevented, and the fold-out movement follows;
for a drawing and/or locking of at least one of the façade or awning elements to be provided with respect to at least one of the guides in the locking means that effect the extended position, and for at least one means to be provided, which will bring the locking means out of engagement at the start of the opening movement;
for at least one means for bringing out of engagement to be provided on the tension or pressure element;
for the extension zone to comprise a spring assembly which acts on the tension element;
for a free travel zone to comprise an elongated hole;
for the drive element to be provided with the at least one carrier;
for at least one carrier element to be provided at the unattached fold-out lever end;
for the awning elements to have visible areas made of transparent, translucent or perforated material and/or comprised of heat-insulating panels and/or sound absorbing panels and/or burglar-proof panels;
for at least one of the awning elements to be a solar cell substrate or to be embodied as a solar cell or a solar cell assembly;
for the fold-out lever to have a stop for limiting the pivoting angle of the fold-out lever in relation to an intermediate lever or a pivotable locking means of the linked lever assembly;
for a pivotable intermediate lever or a pivotable locking lever to be configured as two components with lever elements that can pivot in relation to one another, and for the lever components to assume an angular position relative to one another in the locked position which serves as the arresting means;
for the drive element to be endless;
for a rotating cable/toothed belt combination or a rotating roller chain to be provided as the drive element;
for at least one fold-out lever, which is seated on one of the façade or awning elements, to form an articulated assembly which is stressed in the extended position and promotes folding out, and which in the compressed position is shortened in its active length over a stressing element, through a carrier which moves with the actuating means, drawing in the at least one façade or awning element;
for a steering lever to be provided for controlling the movement of the fold-out lever with respect to the locking lever, which is pivoted by the drive element and independently of the fold-out lever;
for a carrier embodied as a sliding element or rolling apparatus, such as a movable pawl element, to be uncoupleable from the actuating element when it reaches approximately the area of an upper turning point, a winding point of the actuating element, or the like;

for at least one edge of the façade or awning element that is parallel to the guide to be provided with and/or protected by edge protection elements, for example with at least one link projecting outward or, preferably, inward;

for a fold-out or locking lever that is present to be provided at least in the area of its unattached end with a bumper for its impact against a component that is fixed to the building;

for a pawl element to be provided on one of the façade or awning elements, which on one hand is embodied by an opening pawl, especially formed from the rear side of the one façade or awning element, and on the other hand is embodied by a closing pawl, which is especially formed with the help of a tab or some element with an equivalent function which projects from the rear side of the one façade or awning element, and guarantees the engagement of the unattached end in the interior of the pawl.

The aforementioned components, described in the exemplary embodiments and to be used according to the invention, are subject in terms of their size, configuration, choice of materials, and technical design to no particular exceptional conditions, so that the criteria for selection known in the area of application can be applied without restriction.

Additional details, characterizing features and advantages of the invention are specified in the subordinate claims and in the following description of the connected drawings and table, in which—by way of example—exemplary embodiments of a horizontal folding façade arrangement are represented.

BRIEF DESCRIPTION OF THE DRAWINGS

The drawings show

FIG. 1 a perspective view of a horizontal folding façade or folding awning arrangement in an extended, closed position;

FIG. 1A a perspective detail view taken from "A" in FIG. 1;

FIG. 2 a first exemplary embodiment of a combined release and fold-out arrangement of a folding façade or folding awning arrangement, corresponding to a right side view of FIG. 1;

FIG. 4A-4C a third exemplary embodiment of a folding façade or folding awning arrangement, in which FIG. 4A shows the entire arrangement from above FIG. 4C shows Detail A taken from FIG. 4A FIG. 4B shows a vertical sectional view of the release and fold-out arrangement-section along the line 4B-4B in FIG. 4C;

FIG. 5A-5F an additional embodiment of a folding façade or folding awning arrangement and an actuating element for this, a closing and opening sequence in the sectional representation of FIG. 3 (FIGS. 5A through 5E) and corresponding to the sectional representation of FIG. 4A (FIG. 5F);

FIG. 7A-7C yet another embodiment of a folding façade or folding awning arrangement from a side view and partially opened (FIG. 7A) and in two working positions of the operating mechanism in a vertical sectional representation corresponding to FIG. 3, wherein FIG. 7B represents the situation at the start of the locking phase and FIG. 7C represents the situation at the end of the locking phase;

FIG. 8A-8B an articulated operating mechanism for a folding façade or folding awning arrangement in a vertical sectional representation corresponding to FIG. 3, wherein FIG. 8A represents an extended position and FIG. 8B represents the drawing phase, also corresponding to the fold-out phase;

FIG. 9A-9D another operating mechanism similar to that of FIG. 3, but with guide rails which open up laterally (and not frontally), wherein FIG. 9A shows a plan view from the outside, FIG. 9C shows the start of the drawing phase in a lateral vertical section, corresponding to FIG. 3, FIG. 9B shows the extended position at the start of the release process in a lateral vertical section (section A-A according to FIG. 9A) and FIG. 9D shows the operating mechanism in a horizontal section (section B-B according to FIG. 9A);

FIG. 13A-13J a further alternative embodiment of a folding façade or folding awning arrangement in a side view in an opening sequence (FIG. 13A-E) and in a closing sequence (FIG. 13F-J), partially shown in detail.

DETAILED DESCRIPTION

Figure 3A:
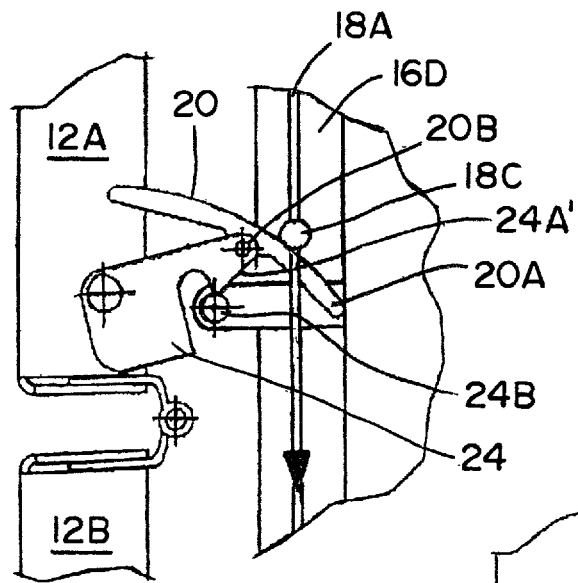
FIG. 3A-3F a second exemplary embodiment of a combined release and fold-out arrangement of a folding façade or folding awning arrangement, corresponding to a right side view of FIG. 1A as a sequence of movements for closing (FIG. 3A-3C) and for opening (FIG. 3D-3F)

Referring now to the drawings wherein the showings are for the purpose of illustrating exemplary embodiments of the invention only and not for the purpose of limiting same, FIG. 1 shows a folding façade or folding awning arrangement, which can be used both for the openable closing of building openings and as an openable curtain façade. It comprises two façade or awning elements 12A and 12B provided in pairs, which can be inherently rigid, of which the first, in this exemplary embodiment the uppermost, façade or awning element 12A is indirectly fastened to a building, labeled 1, so as to be pivotable around a stationary and in this case horizontal axis 12A'. Fastening is implemented via elongated, rod-shaped profiled support pieces 16E, which are equipped with guides 16A and 16B and are fastened to the building 1. The axis 12A' is seated with respect to the two guides 16A and 16B. The second façade or awning element 12B, in the case of this exemplary embodiment the lower façade, is held at its end near its (second) element edge 13, i.e., in this case at the lower end, in one of the guides 16A and 16B each, and can be displaced vertically, and thereby pivoted in the direction of the double arrow $S_2$ during raising. Opposite and substantially parallel to the element edge 13B, the second façade or awning element 12B has a (second) fold-out edge 15A, adjacent to which a (first) fold-out edge 15A of the adjacent first facade or awning element 12A is located, which is arranged substantially parallel to the stationary pivoting axis 12A'. Near these two fold-out edges, a single- or multi-part fold-out joint 14A, 14B is provided, which pivotably connects the two fold-out edges 15A, 15B with one another, but leaves them released from the guides 16A and 16B, so that a folding out (see double arrow A) toward the façade is possible.

An opening and closing of this folding façade or folding awning arrangement is effected in that, ordinarily, an elongated drive element, such as tension element 18A, is arranged along the guides 16A and 16B and can be actuated in a suitable manner, for example by winding or rotating motions (FIG. 13), or by displacement or some other linear motion. The tension element is fastened near the unattached element edge 13, for example in the area of guide rollers 17 arranged at the end there, which run in the guides 16A and 16B. They are arranged in pairs and spaced vertically on a guide carriage or sliding element (cf., FIG. 6C), which thereby remains angularly rigid.

In this manner, the sequence of movements for opening, and the reverse sequence of movements for closing, indicated in FIG. 1A and completed in FIG. 1B, can be executed. The guides 16A and 16B are located near the lateral edges of the façade or awning elements 12A and 12B. In this manner, a larger, lined façade can be constructed, which can consist of both stationary and the movable elements 12A and 12B illustrated here. Naturally, embodiments such as a large gate with a door or the like can also be realized.

The façade or awning elements 12A and 12B can be very differently constructed and can serve different purposes, for example as burglary and/or noise protection plates, as inoperative, transparent or translucent curtain facades with or without perforations, in other words as climate control means. They can also serve as heat insulating or heat-proof plates to protect against thermal radiation during the day or against night-time heat emission from the building 1. They can also serve as solar panels or the like, wherein for this purpose the first façade or awning element 12A is principally used and can be adjusted as the day progresses based upon the angle of the sun's rays. They can also have perforated plates, stretched screen or fabric elements, or louvered arrangements comprised of spaced shade louvers as a surface element, optionally with a frame.

The upper fulcrum of the upper folding element can be positioned independently of an input shaft responsible for both sides of the arrangement. In all the figures, however, this fulcrum is shown inside a bracket, together with the input shaft mount.

The fulcrum positions can be completely different. In this manner, depending upon the selection, a smaller or larger folding angle can be achieved. Only the distance between the drive shaft and the lower edge of the folding element 12 B (13 B) is predetermined based upon the free travel, the height of the running carriage, and the cable connection.

It is also possible for the drive shaft and the lateral guide rails to be drawn higher, lying hidden behind the façade for this reason.

In order to achieve the greatest possible depth to the fixed structural component in the raised position for a solar panel or for rain protection or solar protection paneling, the paneling of the upper folding element (12 A) can project beyond the lower end (15 A)—at most to the lower edge 13 B of the lower folding element. The embodiment can then be configured such that, rather than the lower façade element (12 B), only 2 perpendicular profiled arms on the left and right are used, which are connected at the bottom to the carriage and at the top to the upper façade element 12 A in an articulated manner.

The folding joint 14A, 14B can be configured as a continuous profiled belt. The façade or awning elements 12A and 12B can be free of visually disruptive attachments, because the operating mechanism described in what follows (see Detail "A") can be housed directly in the area of one or both side edges of the façade or awning elements in a flat configuration, so that, maintaining a spacing joint, additional façade lining elements or folding façade or folding awning assemblies can be attached, without aesthetically disruptive mechanical components.

Whereas the operating mechanism illustrated in Detail "A" of FIG. 1A will be specified in greater detail in connection with FIG. 3, in what follows a first exemplary embodiment of an operating mechanism will be described in reference to FIG. 2: Inside each guide chamber 16D for the guide 16A, 16B, a guide roller 17 or guide roller assembly, optionally configured in pairs, can be moved near the ends of the second element edge 13B in a known manner. A tension element 18A, embodied in the exemplary variant as a wire cable, also extends in the guide chamber 16D and has a carrier 18C, which can be moved upward and/or downward (double arrow H) with the tension element 18A.

In the area of the folding joint 14A, 14B, a balanced fold-out lever 20 is seated so as to pivot on its rocker pivot 20B on at least one side edge of the first façade or awning element 12A near the first fold-out edge 15A and (in the extended position of the façade and awning elements shown in FIG. 2) is tilted downward. Its unattached end 20A is held in contact with the rear wall (16D') of the guide chamber 16D of the guide 16A by means of a counterweight, or alternatively a spring assembly. The unattached end of the fold-out lever 20, which is flat in structure, extends through the conventional guide slot 17A (in this case on the front side), through which the guide roller 17 is also tied to the façade or awning element 12A, 12B.

The function of the fold-out lever 20 is as follows: When the carrier 18C in the represented case comes into contact with the guide 16D from below on the fold-out lever 20 and continues to move in the opening direction, in this case upward, the unattached lever end 20A is pushed along the rear wall 16D' of the guide 16D, pivoting the fold-out lever 20 upward, thereby increasing the distance from the fold-out edge 15A that pivots around the axis 12A'. Only after this initial fold-out or drawing-out process has been implemented does the upward tensile action of the lower end of the tension element 18A on the unattached element edge 13 begin. Because of the initial folding out process which has already been executed, the folding out process can now continue without friction, opening the folding façade or folding awning arrangement toward the fully opened state shown in FIG. 1B. So that the tension element 18A will be held sufficiently taut even during the initial folding-out motion, as the fold-out lever 20 pivots upward, an extension zone 22 of the tension element 18A, not illustrated in detail in the drawing is provided, which can be embodied, for example, as a spring or weight assembly. This extension zone holds the tension element 18A under tension in a flexible (spring) or inflexible (weight) manner. Because of the low amount of force required to move the fold-out lever, a slack cable section of the tension element can be prevented by holding the cable taut during the initial fold-out phase, and can reach full tensile stress for raising the second element edge 13B at the end of the initial fold-out path.

In the exemplary embodiment of FIG. 2, a locking device is also provided, which secures the façade or awning elements against transverse movement in the area of the folding joint 14A, 14B in the illustrated extended position. In this, a locking lever 24A, which is pivotably attached to the first façade or awning element 12A near the folding joint, and a locking stop 24B, which is stationarily attached to the guide 16A, serve as the locking means. A lever surface 24A', which also serves as the sliding surface for locking with the locking stop 24B, also serves as the stop for the carrier 18C for opening. During an opening movement, the carrier 18C first comes in contact with this lever surface 24A, raising the locking lever 24A out of the locking position. Only then does the carrier 18C come into contact with the fold-out lever 20, in order to initiate the fold-out process described further above. However, a locking of this type can also be used as such without the fold-out lever.

Figure 3B:
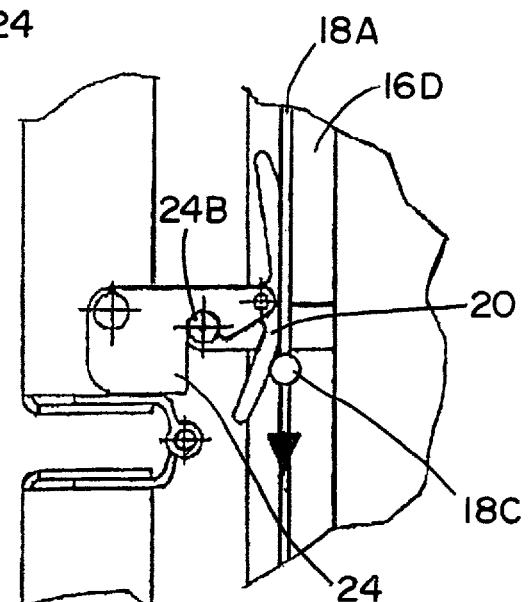
Figure 3C:
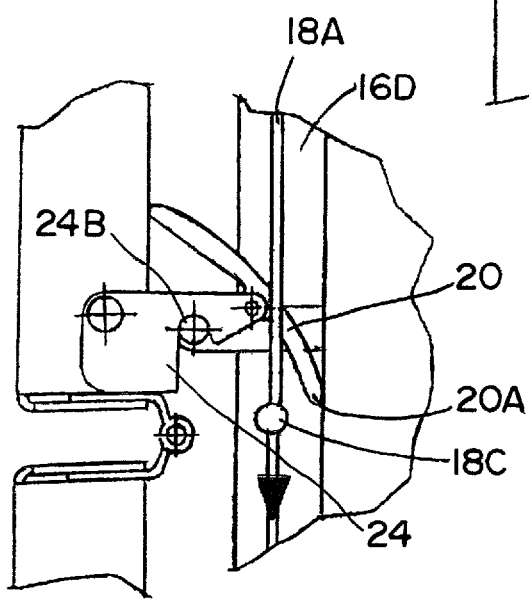
Figure 3D:
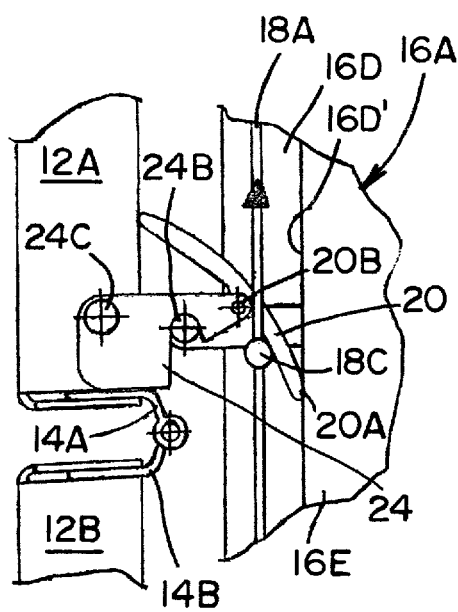
Figure 3E:
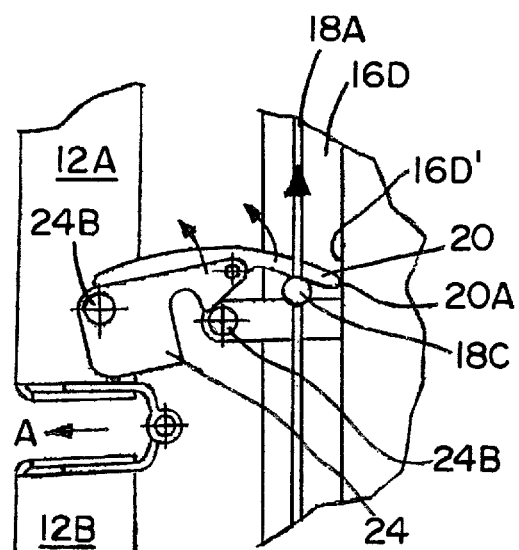
Figure 3F:
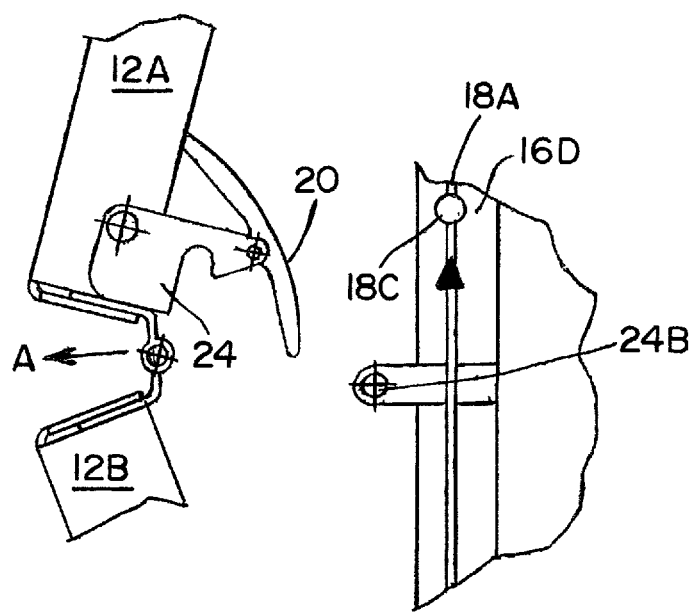

The exemplary embodiment of FIG. 1A will be specified in greater detail in what follows, within the context of the sequence of movements of FIG. 3A through 3F: In contrast to the exemplary embodiment of FIG. 2, in this exemplary embodiment the (also balanced) fold-out lever 20 is pivotably attached with its rocking pivot 20B near the unattached end of a locking means, and with the locking lever 24A, which serves as an intermediate lever, forms a two-component lever assembly, such that first the intermediate lever is brought to the release position in the opening movement, before the advancing carrier 18C initiates the fold-out motion, as was already essentially described in connection with FIG. 2. The fold-out sequence of FIGS. 3D through 3F shows the still locked extended position FIG. 3D, the already released, dead-center position of the fold-out lever 20, assumed for the first folding out (FIG. 3E), and a definite folded out position, in which the unattached element edge 13 is already raised a certain amount. The closure sequence according to FIGS. 3A through 3C illustrates how, in the closing movement to the extended position of the façade or awning elements 12A and 12B, the lever surface 24A' serves as the gliding surface to the locking stop 24B. After snapping into the locked position (FIG. 3B), the carrier 18C moves downward past the curved outer surface of the output lever 24, until it reaches a position below the unattached end area 20A of the output lever 20 (FIG. 3C). With this, the closing process is completed and the carrier 20C is in a position below the fold-out lever 20, so that when it is raised again, it reaches a position below the fold-out lever 20 and the locking means linked with it.

The exemplary embodiment according to FIGS. 4A-4C differs from the preceding essentially in that a flat belt with a sufficiently rough surface is used as the pressure-resistant tension element 18A, so that an independent carrier is not needed to carry the unattached end 20A of the fold-out lever 20 along during the opening motion. A stop 20C ensures a limit to the pivoting of the fold-out lever 20, which is equipped with a counterweight 20D. During the closing process, the tension element 18B moves downward without difficulty (with the unattached end 20A of the fold-out lever 20 resting against it).

The compact internal structure of the guide 16A is discernible from the Detail "A" of FIG. 4A that is shown in FIG. 4C, in which the drive element 18, the guide rollers 17 for the second façade or awning element, and the part of the fold-out lever 20 that projects into the guide chamber 16D is housed. In addition, an edge protection element 12C is provided on one of the side edges of the façade or awning elements 12A/12B with a land that faces toward the guide, which can be provided on the guide as an alternative or as a supplement (land 12C').

The exemplary embodiment of FIG. 5A through 5F differs from the exemplary embodiment of FIG. 3A-3F in that an unbalanced fold-out lever 20 is used, and in that this fold-out lever has a pawl element 20E. In this exemplary embodiment, the fold-out lever 20 can be placed in an extended position (FIG. 5A) under spring tension relative to the locking lever 24A, and the locking means is placed, under spring tension, in an initial position, tilted slightly upward (FIG. 5A). As is apparent from FIG. 5A, during the closing process the carrier 18C enters the pawl element 20E and pivots downward as the fold-out lever 20 continues to move downward, wherein a contact surface 20F of the fold-out lever 20" near its rocking pivot 20B advances or enables the drawing of the fold-out joint 14A, 14B into the extended and locked position (FIG. 5B). Once the locking process is completed, in other words when the locking means 24A is engaged in the locking stop (FIG. 5C), the carrier 18C can also move back out of the pawl element 20E (downward) if necessary, however this is not absolutely necessary for continued functioning, as is apparent from the carrier position in FIG. 5D. Starting from this position (FIG. 5D), the carrier effects an upward pivoting of the locking lever 24A as the drive element 18 is raised to the opening pawl 20E situated opposite the closing pawl 20E', while the opening pawl 20E' is still sliding against the rear wall of the guide chamber 16D, thereby still preventing an upward pivoting of the fold-out lever 20 in this phase. Only when the locking means 24A is unattached in front of the locking stop 24B can the fold-out lever 20 pivot upward under the tension of the carrier 18C, thereby effecting the desired increase in the distance between the rocking pivot 20B of the fold-out lever and the guide (FIG. 5E). As the raising of the carrier 18C continues, the carrier is again released from the pawl element 20E and the façade or awning elements 12A, 12B can be moved further into the open position as folding out continues.

Figure 6A:
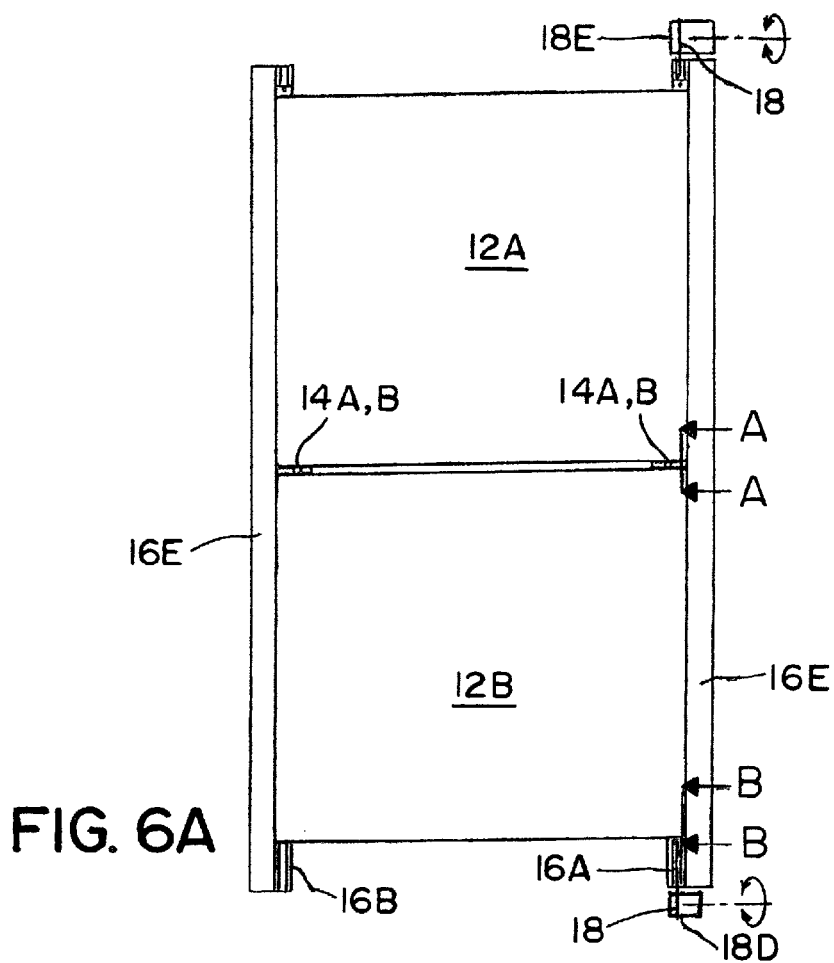
FIG. 6A-6C another alternative embodiment of a folding façade or folding awning arrangement in a view from the outside (FIG. 6A), in a vertical sectional representation A-A according to FIG. 6A (FIG. 6B) and in another vertical sectional representation B-B according to FIG. 6A (FIG. 6C)
Figure 6B:
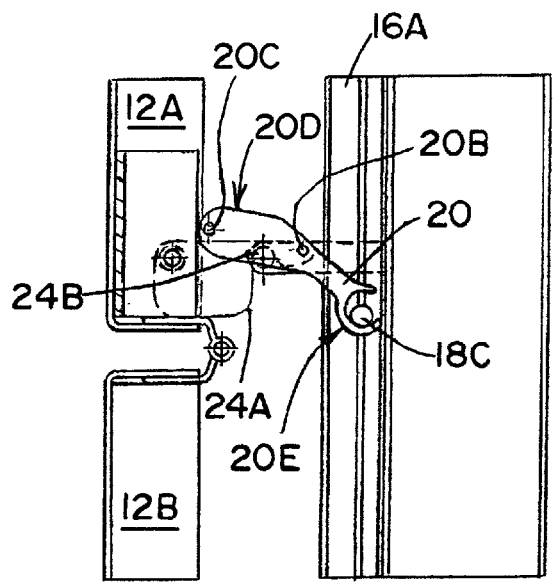
Figure 6C:
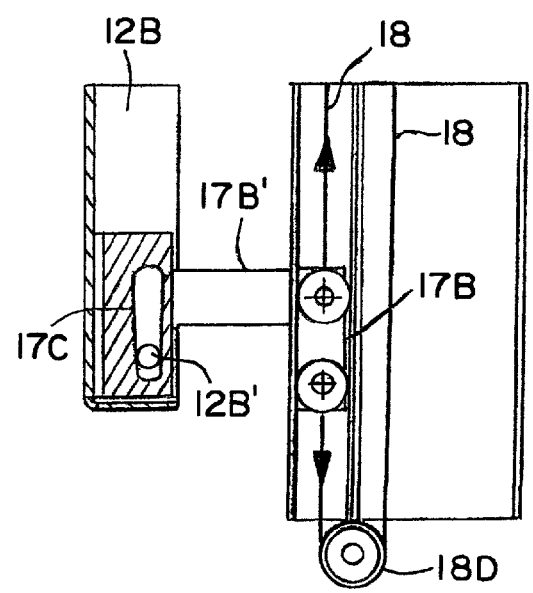

In the exemplary embodiment of FIG. 6A through 6C, a pawl element 20E which functions in a manner comparable to FIG. 5 is provided, wherein, in contrast to FIG. 5, the fold-out lever is balanced with a counterweight (cf., FIG. 4) and has a stop 20C, which prevents further pivoting of the fold-out lever 20 in relation to the locking lever 24A when said fold-out lever is resting on the locking lever. This exemplary embodiment further shows a sliding element 17B in the form of a carriage equipped with two rollers spaced from one another in guide directions, the side arm 17B' of which engages through the slot 17A in the guide and forms a pivoting axis 12B' with the second façade or awning element 12B near its unattached element edge 13. In this manner, a smooth and vibration-free opening and closing movement is ensured, even with greater horizontal distances between the guide and the second façade or awning element. A wedge-shaped elongated hole 17C which expands toward the top creates a free travel zone during the opening and closing movement, so that locking and release can take place without transverse movement of the folding joint. The wedge shape of the elongated hole minimizes the risk of vibration with a fully locked folding joint. Also discernible from this exemplary embodiment is that the profiled support 16E of the guides 16A, 16B can also extend to the side, outside of the façade or awning elements 12A, 12B, in other words it can visually encompass these to the side, forming a uniform front with their exterior surface. In this manner, static and aesthetic aspects of a façade configured according to the invention can be taken into account. FIG. 6 (along with FIG. 12) also shows that the drive element 18 can also be advantageously rotated on at least one of the guides 16A, 16B (turning rollers 18D, 18E), especially rotating continuously, allowing the carrier(s) 18C to be moved very precisely but simply in both directions.

The exemplary embodiment of FIG. 7A-7C also has a pawl element (20E) at the unattached end of the fold-out lever 20. In contrast to the preceding exemplary embodiment, the locking lever 24A is configured in two parts and consists of the linked lever elements 24', 24", which are pivotably connected to one another. In this embodiment, relatively large fold-out paths (also referred to as "folding paths") can be realized, as is apparent from the side view shown in FIG. 7B. At the same time, the additional lever element 24" can already be situated in an earlier closure stage on the locking stop 24B, and can actively support drawing the folding joint 14A, 14B toward the guide, i.e., assuming the extended position. The relative pivoting of the two lever elements 24', 24" that this entails causes these two elements to form an approximately hook-shaped element which engages behind the locking stop 24B at the end of the closing movement (FIG. 7C).

The exemplary embodiment of FIG. 8A/B shows a fold-out lever in the form of an articulated assembly, in which a spring assembly 201 in the form of a tension spring moves past an extended position of the articulated assembly (FIG. 8B) when no counterforce is being applied. A counterforce is created by a tension arrangement (FIG. 8B) acting transversally to the spring assembly, which in the illustrated exemplary embodiment can consist of a flexible tension element, such as a cable, with a hook 20H' at its end, and is arranged such that the tension cable can lie around a stationary locking stop 24B. Starting from the opened position (FIG. 8B) it is apparent that the carrier 18C of the drive element 18 can engage the hook 20H', and carries it along, so that the articulated assembly 20G is compressed against the tensile force of the spring assembly 201, thereby drawing the façade or awning elements 12A, 12B to the extended position, wherein the articulated assembly, as is illustrated, can be supported against the locking stop 24B, for example (FIG. 8A). In this manner, locking in the extended position is ensured, and vibrations are held within very narrow limits due to the flexible pre-stressing of the spring. Nevertheless, impact stresses can be absorbed in order to protect the assembly. For opening, the carrier 18C is raised and folding out can begin without delay, supported by the articulated assembly 20G.

In the exemplary embodiment of FIG. 9A through 9D, the difference from the exemplary embodiment of FIG. 4 consists, for one, in that the fold-out lever is not balanced and that the guide slot 17A of the guides 16A and 16B points toward the side and therefore disrupts the front view less when the façade is opened. The carrier 18C must then (as shown) be moved out of the guide chamber or—depending upon the configuration of the fold-out lever—inserted into it from the side, or a window in the front area of the guide must ensure an engagement of the fold-out lever in the guide chamber in the corresponding zone. The sliding or rolling surface 16D' located to the side of the guide is equipped with a bumper 20A' (as with FIG. 10) or is configured as such, at least in the necessary elongated area, so as to muffle noises and/or to soften impacts.

Figure 10:
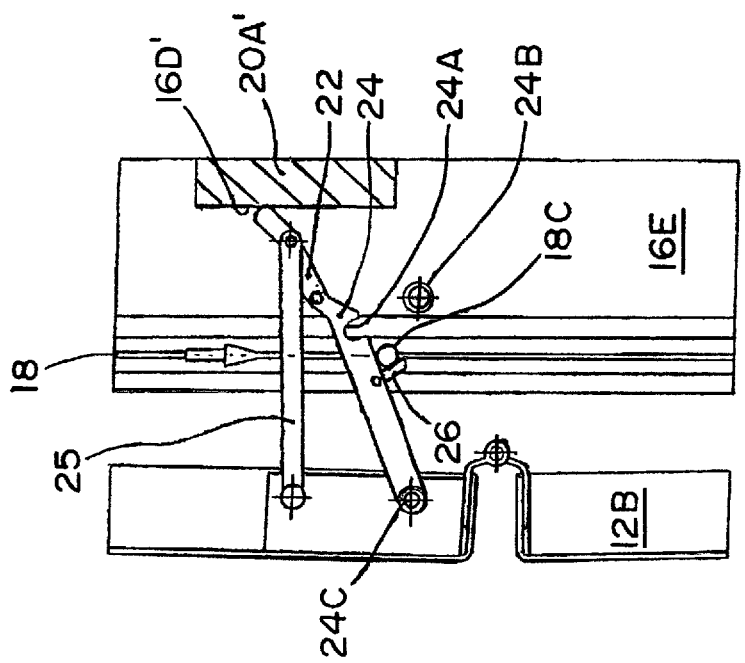
FIG. 10 a further exemplary embodiment of an operating mechanism in the lateral vertical section according to FIG. 3 with a steering lever.

In the exemplary embodiment of FIG. 10, a linking lever 25 is pivotably attached at one end to the first façade or awning element 12A, spaced from the rocking pivot 24C of the locking lever 24. At its second end, the linking lever is pivotably attached to the fold-out lever 20, thereby creating a four-point linking assembly, which allows control of the movement of the fold-out lever 22 based upon the pivoting movement of the locking lever 24. In this exemplary embodiment, the locking stop 24B can also be shifted to an area of the guide 16A/B or the associated profiled support 16E. To enable the carrier 18C to move past the locking lever 24 as it moves downward, a tilting lever 26 is provided, which allows the carrier to pass downward, and makes it possible for the carrier to carry along the locking lever 24 as it moves upward. In addition, the tilting lever 26 is balanced or held under elastic pretension.

Figure 11:
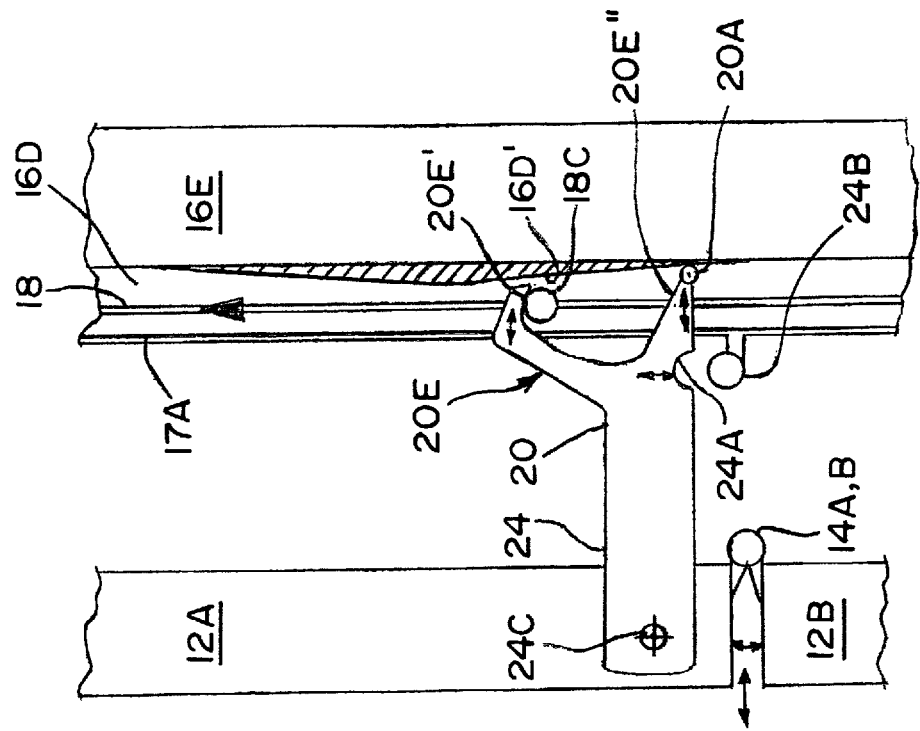
FIG. 11 a further operating mechanism for a folding façade or folding awning arrangement in a lateral sectional representation according to FIG. 3, with a single-arm lever with dual function (locking and folding out) and FIG. 12A-12C yet another operating mechanism for a folding façade or folding awning arrangement in a lateral sectional representation corresponding to FIG. 3 with a double-arm lever with dual function (locking and folding out)

The exemplary embodiment of FIG. 11 shows a lateral sectional representation of an operating arrangement for a folding façade or folding awning arrangement corresponding to FIG. 3, with a single-arm lever 24, 20 with a dual function (locking and folding out) and a sliding or rolling surface 16D', embodied as a sliding plane—oriented at an angle in relation to the guide 16A—on which the unattached end 20A of the combined locking/fold-out lever is supported, shifting in fold-out direction A as the carrier 18C continues to raise it, as shown in FIG. 11.

FIG. 12A through 12C show an operating mechanism for a folding façade or folding awning arrangement with a two-arm lever with dual functions (locking and folding out) as a sequence of motions. Contrary to the preceding examples, a rocking pivot holder 27 arranged fixed to the building supports the rocking pivot 24C, 20B of the fold-out and locking lever 20, 24, one end of which, as a pawl element 20E, cooperates in the manner already described above with a carrier 18C which projects laterally out of the slot 17A of the guide 16A. The part of the two-arm lever disposed on the other side of the rocker pivot 24C, 20B serves at its unattached end 20A both for drawing in (cf., FIG. 12A/B) the façade or awning elements 12A, 12B and for folding (cf., FIG. 12B/C) out of the extended position, as indicated by arrows R and F in FIG. 12B. This is carried out in cooperation with a pawl element 24D", provided on one of the façade or awning elements 12A, 12B, with an opening pawl 24D' formed from the rear side of the one façade or awning element, and with the help of a tab or some element with equivalent action, acting as a closing pawl 24D"', which projects from the rear side of the one façade or awning element, and which allows the engagement of the unattached end 20A, embodied as a roller, into the interior of the pawl to act as a stop or locking double stop 24D. The unattached tab end can be embodied as flexible, thereby effecting a smooth drawing in (FIG. 12B) and a cushioning at the end of the closure path by a flexible abutting piece fixed to the building. This exemplary embodiment also shows an endlessly rotating drive element 18, 18A, 18B, which, in contrast to the exemplary embodiment of FIG. 6, is advantageously embodied with laterally oriented slots 17A and as a box-shaped, closed, and fully integrated support and guide element.

Figure 13A:
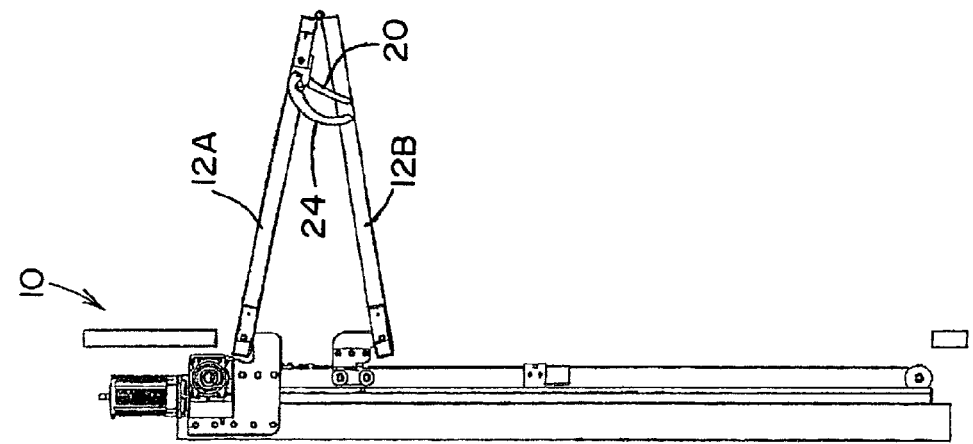

FIGS. 13A and 13J show a further embodiment of the invention, according to which—in contrast to the preceding exemplary embodiments—a carrier element 20', such as a bolt, projects transversely at the unattached end of the fold-out lever 20 and the carrier 18C is configured as a pawl with upper and lower stops 18C', 18C", of which one or the other cooperates with the carrier element 20'. The drive element 18 is a combination of a tension element 18A' in the form of a cable or wire or some other material and a tension element 18A" in the form of a toothed belt, said combination traveling around upper and lower turning elements (turning rollers 18D, 18E), and passing at the upper turning point around a motor-driven turning roller 18E, embodied as a toothed pulley, which is actuable on both sides. The cable component is guided around the lower turning roller 18D and has upper and lower stops 19A, 19B near its coupling element 18F with the toothed belt. Between these stops, the cable component is guided with sufficient radial play through an elongated channel 21A in a rollable slot 21, which has upper and lower counter stops. This results in a free travel arrangement for releasing and folding out, and vice versa—as will be specified further below. The height of the carriage 21 can be adjusted via rolling on its guide rollers 17 in the guide 16A or 16B, and the carriage is seated so as to be pivotable in relation to the lower façade or awning element 12B near its lower element edge 13B. The fold-out lever 20 is non-rotatably connected to a shaft 20K, which is laterally offset from the fold-out lever and non-rotatably supports a locking lever 24, which is crescent-shaped, for example, so that the two levers can be pivoted only together by means of the shaft 20K, and point in approximately the same direction. A spring, which is not discernible here, forces this lever assembly against a stop, such that the fold-out lever 20 in the stop position is spaced at approximately a right angle from the façade or awning element (12A) to which it is pivotably allocated (see FIGS. 13D and 13F and 13G). A locking stop 24B is fastened in a height-adjustable fashion to the guide 16A or 16B, and the locking lever 24 is able to engage behind it. Alternatively, only the fold-out lever is able to pivot in relation to the intermediate or coupling lever 23 and the locking lever, if applicable, against the force of a restoring spring; in this, the locking lever can therefore be rigidly fastened to the intermediate or coupling lever 23 or embodied to form a single component with it.

Figure 13B:
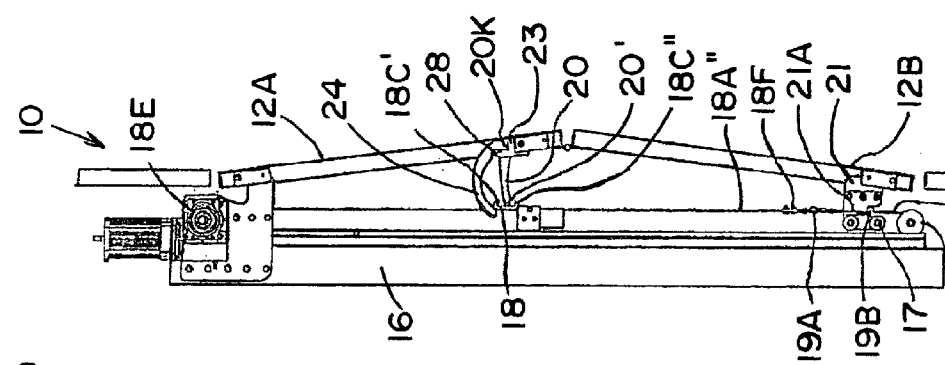

The operating sequence for opening is then such that in the closed and locked position (FIG. 13A) the toothed belt 18A" pulls the carrier element 20' of the fold-out lever downward as far as possible, via the optionally height-adjustable carrier 18C that is connected to said belt, and the cable component is placed with its upper stop in contact with the corresponding counter-stop of the carriage 21. With the initial upward movement of the toothed belt, the carrier 18C first moves from the bottom with its lower stop against the carrier element 20', and then pushes the still relatively steep fold-out lever 20, and thereby also the locking lever 24, upward slightly, causing the locking lever 24 to disengage from the locking position with the locking stop 24B (FIG. 13B). This occurs when the drive element 18 is in the free travel phase, as is discernible at the lower end of the drawing.

In order to generate favorable locking forces with the least possible friction and to give the fold-out lever 20 a more favorable inclined position (transverse component) for folding out early in the process, the shared, flexible shaft 20K of the fold-out/locking lever assembly is attached to an intermediate or coupling lever 23, the other end of which is rotatably held and mounted on the one façade or awning element. It is locking position extended transversely to the façade element and lies with its end surface on the guide 16A/B, separated by a bumper 28. In the folded-out positions, the intermediate lever is arranged pivoted 90 degrees, for example, in contact with the façade element and approximately parallel thereto. Other pivoting levers are also possible and can also be dependent upon the active angle of the drawing and locking levers.

Figure 13C:
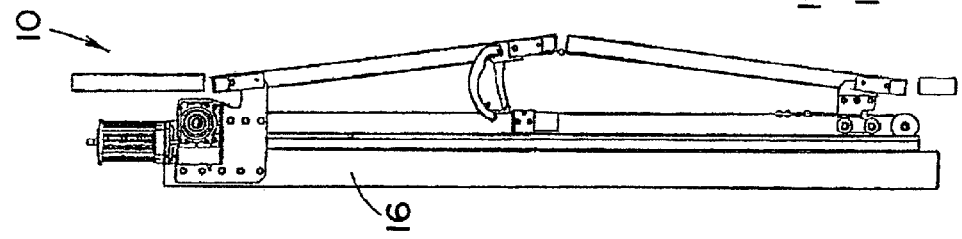
Figure 13D:
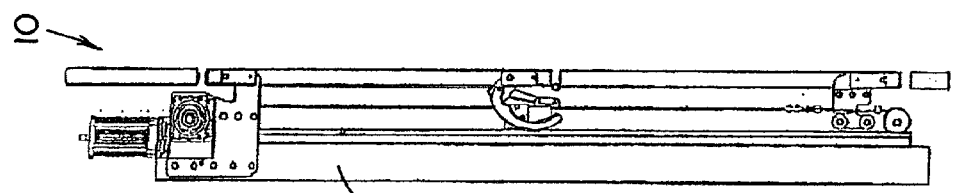
Figure 13E:
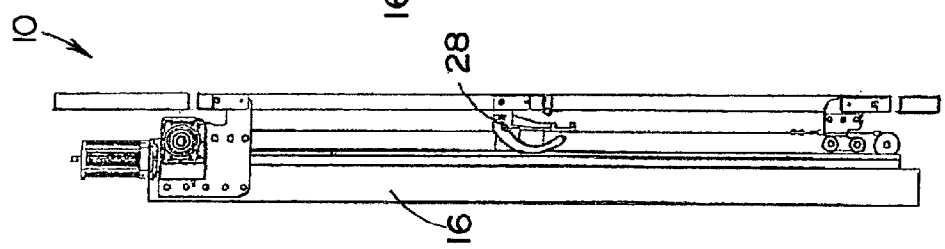

As the carrier 18C continues to rise, the fold-out lever 20 reaches the position shown in FIG. 13C, in which the lower end of the free travel path of the cable component is also reached. As the cable component continues to rise, it raises the carriage 21 via its lower carrier 19B. This results in further folding out, and the unattached end of the fold-out lever 20 is then released from the carrier 18C. The spring on the shaft 20K of the fold-out lever 20 can then pivot it upward as far as possible, so that the stop element 20' continues to rise slightly and can then separate laterally from the carrier 18C (FIG. 13D). As the drive element 18 continues to rise, the arrangement moves into the maximum opening position shown in FIG. 13E.

During closure from this opening position, the folding façade arrangement is lowered by the force of gravity when the carrier 18C is lowered. When the fold-out lever 20, which projects at approximately a right angle, reaches the carrier 18C, it thus arrives at a position in which its carrier element 20' is between the upper and lower stops 18C', 18C" (FIG. 13G). As the carrier 18C is further lowered (FIG. 13H), the free travel arrangement again becomes active and pivots the carrier of the fold-out/locking lever arrangement downward. The locking lever thereby reaches a point behind the stationary locking stop 24B and supports the drawing in of the façade element to the guide, despite a still relatively large fold-in angle, until the unlocked, extended position of the façade arrangement shown in FIG. 13I is reached. In this position, the free travel path of the drive element 18 has not yet been fully traveled. Further downward travel of the carrier 18C forces the locking lever 24 into its safe locked position (FIG. 13J). It has been found that opening after locking is also possible without the movable intermediate or coupling lever (23) if the fold-out lever, the bumper (28) and/or the locking pin are/is flexible in configuration. Under certain circumstances, a rubber bushing on the locking pin or a flexible bushing on the shared shaft pin (20K) is sufficient. A flexible locking lever (24) is also possible. Without flexible locking pins or pins, the intermediate or coupling lever (23) must pivot during opening high enough for the locking lever (24) to be forced out of a clamped position. This currently corresponds to a pivoting range for the intermediate lever of approximately 30°.

The invention has been specified in detail in reference to a number of exemplary embodiments, however it is in no way limited by these and can be implemented in a plurality of additional forms.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A folding awning arrangement, comprising:
   at least two awning elements,
   the at least two awning elements including a first awning element that is fastenable to an associated building so as to pivot around one of a vertical or horizontal first axis near a first element edge, and
   the at least two awning elements further including a second awning element that is held so as to pivot around a second axis, which can be displaced one of vertically or horizontally near a second element edge, and can be displaced along guides that are arranged in pairs, perpendicular to the second element edge;
   and the second element edge can be moved along the guides toward and away from the first element edge of the first awning element by a drive element, the drive element comprising a tension element;
   and in which a first fold-out edge of the first awning element, the first fold-out edge being situated opposite and parallel to the first element edge, is pivotably connected to a second fold-out edge of the second awning element, the second fold-out edge being situated opposite and parallel to the second element edge, thereby forming a fold-out joint, and, when released from the guides, the fold out joint can be folded outward from the guides;
   at least one actuating element and corresponding at least one locking stop
   the at least one actuating element being pivotable about a actuating element axis and includes a locking end spaced from the actuating element axis that is selectively engageable with the corresponding at least one locking stop;
   the at least one actuating element is fastened relative to one of the associated building and the at least one of the at least two awning elements, the corresponding at least one locking stop being fastened relative to the other of the associated building and the at least one of the at least two awning elements, the at least one actuating element being displaceable relative to the other of the associated building and the at least one of the at least two awning elements, and
   the awning arrangement further including at least one carrier fixedly connected to the drive element, the at least one actuating element being displaced to a locked or unlocked position by the at least one carrier and the actuating element can be brought into and out of contact with the at least one carrier when the at least two awning elements are in or near to an extended position.

2. The arrangement of claim 1, wherein the at least one actuating element includes at least one locking lever and the at least one locking lever draws in and locks the at least two awning elements when the at least two awning elements are in or near to the extended position.

3. The arrangement of claim 2, wherein the at least one actuating element further includes at least one fold-out lever and the at least one fold-out lever at least partially folds out the at least two awning elements when the at least two awning elements are in or near to the extended position.

4. The arrangement of claim 3, wherein the at least one locking lever and the at least one fold-out lever are a single pivotable component.

5. The arrangement of claim 4 includes a free travel zone wherein during a start of opening movement of the drive element, the drive element first actuates the at least one locking lever to at least partially release the at least two awning elements, without tensile forces being exerted on the second element edge of the second awning element, which is to be moved.

6. The arrangement of claim 1 includes a free travel zone wherein during a start of opening movement of the drive element, the drive element first actuates the at least one actuating element to at least partially release the at least two awning elements, without tensile forces being exerted on the second element edge of the second awning element, which is to be moved.

7. The arrangement of claim 6, wherein the free travel zone is a section of the tension element with stops at both ends, and further including a guide for guiding the section of the tension element.

8. The arrangement of claim 1, wherein the at least one locking stop includes at least one bumper.

9. The arrangement of claim 1, wherein the at least one actuating element has a pawl element provided for two operating directions, for partially encompassing the at least one carrier of the drive element.

10. The arrangement of claim 3, wherein the at least one actuating element has a pawl element provided for two operating directions, for partially encompassing the at least one carrier of the drive element.

11. The arrangement of claim 1, wherein the drive element can be moved and turned along at least one of the guides.

12. The arrangement of claim 11, wherein the drive element is guided so as to rotate over upper and lower pulleys.

13. The arrangement of claim 1, wherein the at least one actuating element comprises a two-arm lever for locking the at least two awning elements, the two-arm lever being pivotably mounted relative to the one of the associated building and the at least one of the at least two awning elements, the two-arm lever including the locking end which serves as an unattached end for the locking of the at least two awning elements and includes another end that cooperates with the at least one carrier.

14. The arrangement of claim 1, wherein the at least one actuating element comprises a two-arm lever with dual function for locking and unlocking the at least two awning elements, the two-arm lever being pivotably mounted and includes the locking end, the two-arm lever having another end that cooperates as a pawl element with the at least one carrier, the locking end serves as an unattached end for locking the at least two awning elements.

15. A folding awning arrangement, comprising:
at least two awning elements,
the at least two awning elements including a first awning element that can be fastened to an associated building so as to pivot around one of a vertical or horizontal first axis near a first element edge, and
the at least two awning elements further including a second awning element that is held so as to pivot around a second axis, which can be displaced one of vertically or horizontally near a second element edge, and can be displaced along guides that are arranged in pairs, perpendicular to the second element edge;
and the second element edge can be moved along the guides toward and away from the first element edge of the first awning element by a drive element, the drive element comprising a tension element;
and in which a first fold-out edge of the first awning element, which is situated opposite and parallel to the first element edge, is pivotably connected to a second fold-out edge of the second awning element, which is situated opposite and parallel to the second element edge, thereby forming a fold-out joint, and, when released from the guides, the fold out joint can be folded outward from the guides;
an operating mechanism that is displaceable to a locked or unlocked position by a carrier fixedly connected to the drive element and can be brought into and out of contact with the carrier when the at least two awning elements are in or near an extended position; and,
the operating mechanism including a pivotable fold-out lever being pivotably joined relative to one of the associated building and the at least two awning elements, the pivotable fold-out lever being displaceable by the carrier to at least partially fold out the at least two awning elements when the at least two awning elements are in or near to the extended position, the operatine mechanism being brought into and out of contact with the carrier when the at least two awning elements are in or near the extended position.

16. The arrangement of claim 15, wherein the operating mechanism further includes a locking lever configured to draw in and lock and unlock the at least two awning elements when the at least two awning elements are in or near the extended position.

17. The arrangement of claim 16, wherein the locking lever is connected to the fold-out lever wherein the locking lever and the fold-out lever are a single pivotable component.

18. The arrangement of claim 16, wherein the carrier engages with one of the fold-out lever and the locking lever.

19. The arrangement of claim 15, wherein the operating mechanism has a pawl element with two pawl arms provided for two operating directions, the two pawl arms partially encompassing the carrier when the at least two awning elements are in or near the extended position.

20. The arrangement of claim 16, wherein the pivotable fold-out lever and the locking lever are a single pivotable component.

* * * * *